(12) United States Patent
Hayden et al.

(10) Patent No.: US 9,176,531 B1
(45) Date of Patent: Nov. 3, 2015

(54) APPARATUS FOR PROVIDING UTILITY RECEPTACLES AND CABLES AT A SELECTED LOCATION ON A WORKSTATION

(71) Applicant: Premier Manufacturing Group, Inc., Shelton, CT (US)

(72) Inventors: Russ Hayden, Stratford, CT (US); Michael Brandstatter, Ansonia, CT (US); David Black, Orange, CT (US); Michael O'Keefe, Wethersfield, CT (US); Kimberly Golden, Wallingford, CT (US); Ryan O'Connor, Seymour, CT (US); Paul Murphy, Hamden, CT (US); Andrew Grandin, Stamford, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 0 days.

(21) Appl. No.: 14/295,554

(22) Filed: Jun. 4, 2014

Related U.S. Application Data

(60) Provisional application No. 61/832,943, filed on Jun. 9, 2013, provisional application No. 61/832,978, filed on Jun. 10, 2013.

(51) Int. Cl.
*H01H 23/04* (2006.01)
*G06F 1/16* (2006.01)
*G06F 1/18* (2006.01)

(52) U.S. Cl.
CPC .............. *G06F 1/1632* (2013.01); *G06F 1/189* (2013.01)

(58) Field of Classification Search
CPC ...... G06F 1/1632; G06F 1/189; G06F 1/1633; G06F 1/16
USPC ......................................... 174/53; 361/679.01
See application file for complete search history.

(56) References Cited

U.S. PATENT DOCUMENTS

| | | | | |
|---|---|---|---|---|
| 4,792,881 | A | * | 12/1988 | Wilson et al. ................. 361/827 |
| 4,850,014 | A | * | 7/1989 | Gillis et al. ............... 379/413.02 |
| 5,122,069 | A | * | 6/1992 | Brownlie et al. ............. 439/131 |
| 5,980,279 | A | * | 11/1999 | Muller .......................... 439/142 |
| 7,205,488 | B2 | * | 4/2007 | Riner ............................ 174/482 |
| 7,442,090 | B2 | * | 10/2008 | Mori et al. .................... 439/652 |
| 7,511,451 | B2 | * | 3/2009 | Pierce ........................... 320/103 |
| 8,456,819 | B1 | * | 6/2013 | Smith ...................... 361/679.02 |
| 2002/0171998 | A1 | * | 11/2002 | Brennan, Jr. .................. 361/501 |
| 2012/0279516 | A1 | * | 11/2012 | Bouix et al. .................. 132/301 |
| 2013/0154958 | A1 | * | 6/2013 | Clavin et al. ................. 345/173 |

* cited by examiner

*Primary Examiner* — Dhirubhai R Patel
(74) *Attorney, Agent, or Firm* — Raymond A. Nuzzo

(57) ABSTRACT

An apparatus for providing utility receptacles and HDMI cables at a location on a work surface has a bottom panel member and a wall structure attached to the bottom panel member. The wall structure defines an interior region. An interior panel is positioned within the interior region and attached to the wall structure to form upper and lower compartments. An electrical power device is positioned within the interior region and attached to the wall structure. The electrical power device has an electrical power receptacle and device charging ports. A HDMI signal switcher is in the lower compartment and has HDMI input and output connectors. The apparatus includes a plurality of HDMI cables. Each HDMI cable extends from a corresponding opening in the interior panel and has a first HDMI connector connected to a corresponding HDMI input connector and a second HDMI connector for connection to an HDMI signal source device.

13 Claims, 25 Drawing Sheets

APPARATUS FOR PROVIDING UTILITY RECEPTACLES AND CABLES AT A SELECTED LOCATION ON A WORKSTATION

CROSS-REFERENCE TO RELATED APPLICATIONS

This application claims the benefit of the filing date of U.S. provisional application No. 61/832,943, filed Jun. 9, 2013.

This application also claims the benefit of the filing date of U.S. provisional patent application No. 61/832,978, filed Jun. 10, 2013. The entire disclosure of U.S. application No. 61/832,978 is hereby incorporated by reference.

BACKGROUND OF THE INVENTION

1. Field of the Invention

The present invention generally relates to an apparatus for providing utility receptacles and cables at a selected location on a workstation or article of furniture, such as a table, desk, workbench or other surface.

2. Description of Related Art

Devices for distributing and providing utility receptacles at selected locations on a workstation or article of furniture are known in the art. Typical prior art devices are described in U.S. Pat. Nos. 5,230,552 and 5,709,156.

SUMMARY

The present invention is directed to an apparatus for providing utility receptacles and cables at a selected location on a work station that has a work surface. The apparatus comprises a housing which comprises a lower portion and an upper portion. The upper portion has a perimeter and a flange portion that extends about the entire perimeter. The upper portion of the housing has a top opening that is bounded by the flange portion. The lower portion of the housing comprises lengthwise and widthwise walls that are attached to and extend downwardly from the upper portion of the housing. The housing further comprises a bottom panel that is attached to the lengthwise and widthwise walls. The housing has an interior region that is accessible through top opening. The housing is sized so that the lower portion of the housing fits into a through-hole in a work surface of a work station and the flange portion contacts and rests upon the portion of the work surface that extends about the through-hole in the work surface. The apparatus further comprises a receptacle support structure located within the interior region and attached to the lower portion of the housing at a predetermined location above the bottom panel so as to form a lower compartment beneath the receptacle support structure. The receptacle support structure is generally centrally located within the interior region and further includes an interior. The receptacle support structure further includes a plurality of through-holes therein that lead to the lower compartment. A plurality of utility receptacles are attached or mounted to the receptacle support structure. The plurality of utility receptacles comprises AC power receptacles, telephone jacks and USB ports, all of which having electrical contacts. The electrical contacts are located in the interior of the receptacle support structure. A HDMI signal switching device is located within the lower compartment and comprises a plurality of HDMI input connectors and a HDMI output connector. The apparatus further comprises a plurality of HDMI cables. Each cable extends from a corresponding through-hole in the receptacle support structure and has a first HDMI connector connected to a corresponding HDMI input connector of the HDMI signal switching device and second HDMI connector for connection to an external source device. The apparatus further comprises a HDMI output connector attached to the bottom panel of the housing and connected to the HDMI output connector of the HDMI signal switching device.

In another aspect, the present invention is directed to an apparatus for providing utility receptacles and cables at a selected location on a work station that has a work surface, comprising a bottom panel member having a top side, a bottom side, and a wall structure attached to the top side of the bottom panel member. The wall structure comprises a plurality of sections and defines an interior region, wherein at least one of the sections has an opening therein. A horizontally oriented interior panel is located within the interior region and attached to the wall structure so as to form an upper compartment and a lower compartment. At least one electrical power device is located within the interior region and attached to the wall structure. The at least one electrical power device comprises an electrical power receptacle and at least one device charging port which are positioned within the opening in the at least one of the sections. The apparatus further comprises a HDMI signal switcher device located within the lower compartment and comprising a plurality of HDMI input connectors and a HDMI output connector. The apparatus further comprises a plurality of HDMI cables, wherein each cable extends from a corresponding through-hole in the horizontally oriented interior panel and has a first HDMI connector connected to a corresponding HDMI input connector of the HDMI signal switcher device and second HDMI connector for connection to an HDMI signal source device. A HDMI output connector is attached to the wall structure and connected to the HDMI output connector of the HDMI signal switcher device. An electrical power cable provides electrical power to the electrical power device and the HDMI signal switcher device.

The details of one or more implementations of the invention are set forth in the accompanying drawings and the description below. Other features, aspects and advantages will become apparent from the description, the drawings and the claims.

DESCRIPTION OF ILLUSTRATIVE EMBODIMENTS

As used herein, the term "utility receptacle" refers to power receptacles, telephone receptacles or jacks, device charging ports, audio signal receptacles and connectors, video signal receptacles and connectors, HDMI connectors, computer data receptacles, connectors or ports, including USB ports.

As used herein, the term "work station" refers to conference tables, work benches, computer tables, desks and similar articles of furniture.

Figure 1:
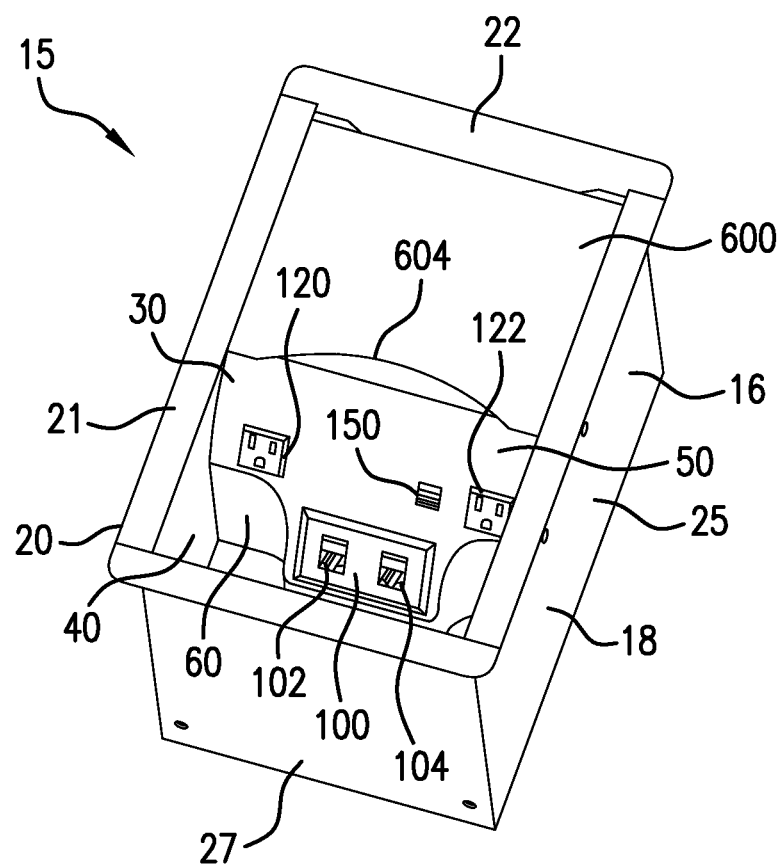
FIG. 1 is a top, perspective view of an apparatus for providing utility receptacles and cables at a selected location on a workstation in accordance with one embodiment of the present invention.
Figure 2:
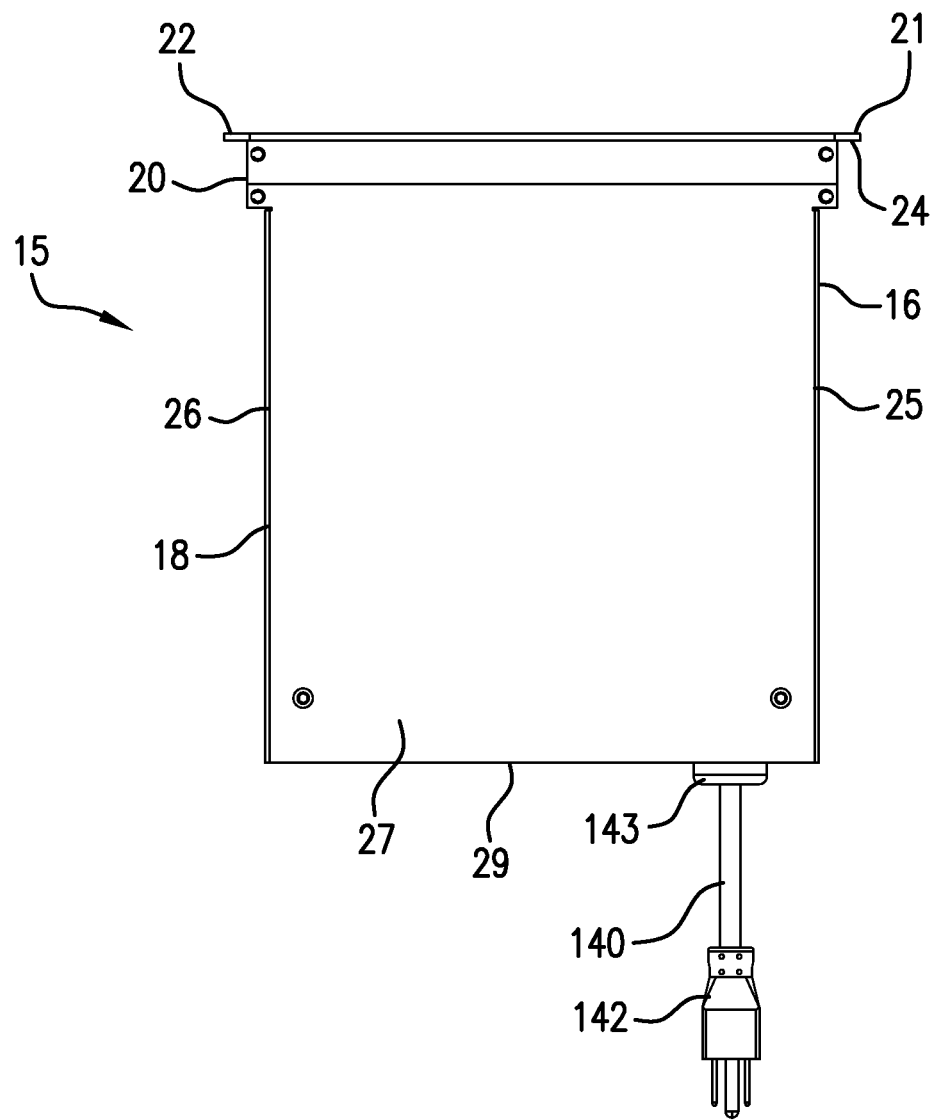
FIG. 2 is a front view thereof.
Figure 3:
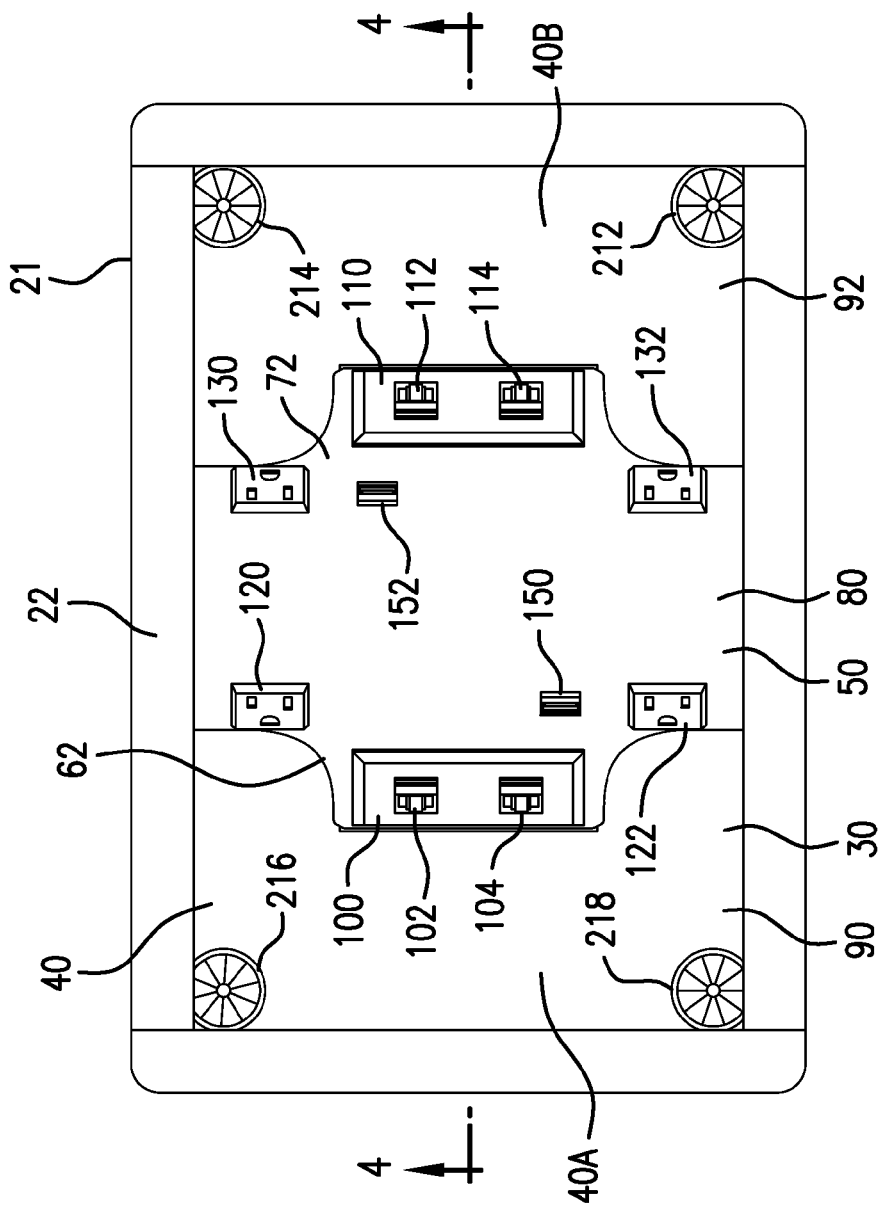
FIG. 3 is a top view thereof, the overlapping cover members not being shown so as to facilitate viewing of a receptacles support structure.
Figure 4:
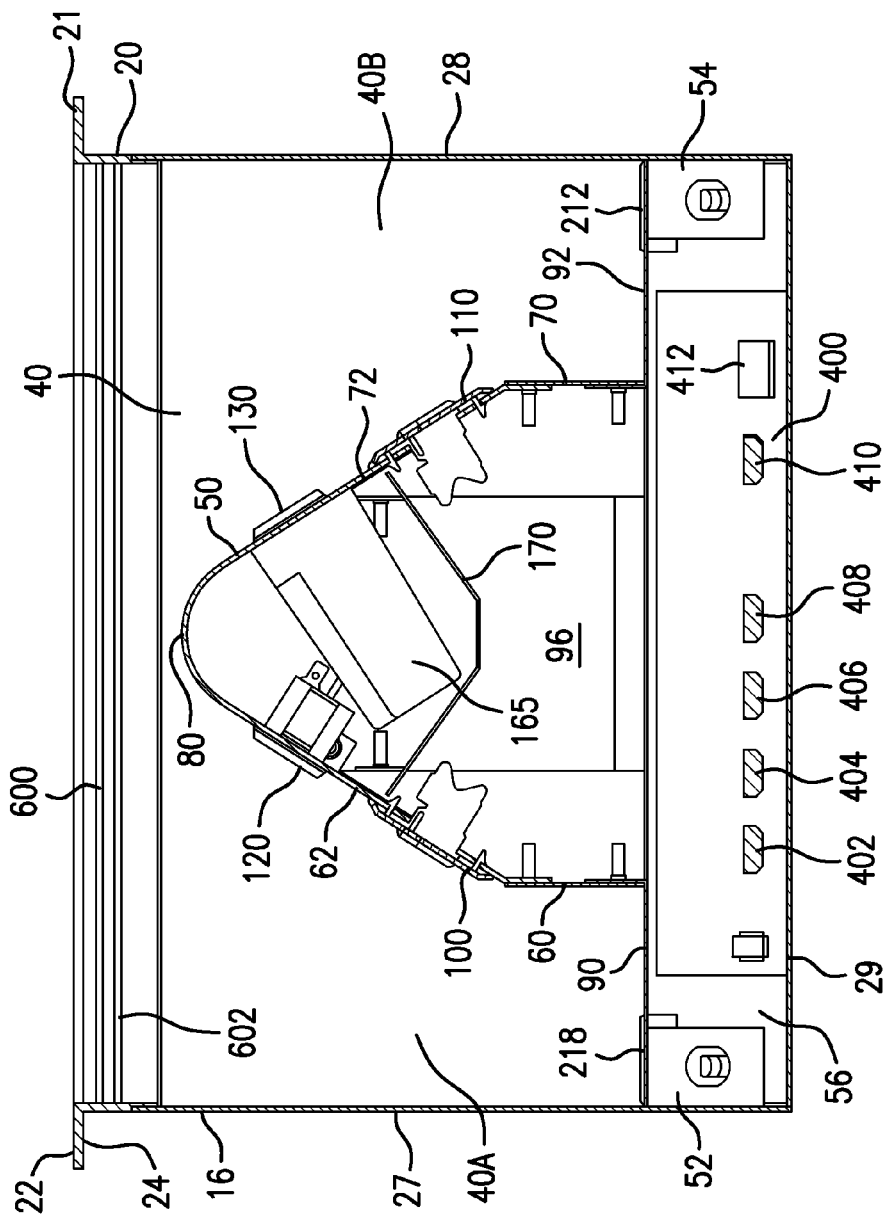
FIG. 4 is a cross-sectional view taken along line 4-4 of FIG. 3.
Figure 5:
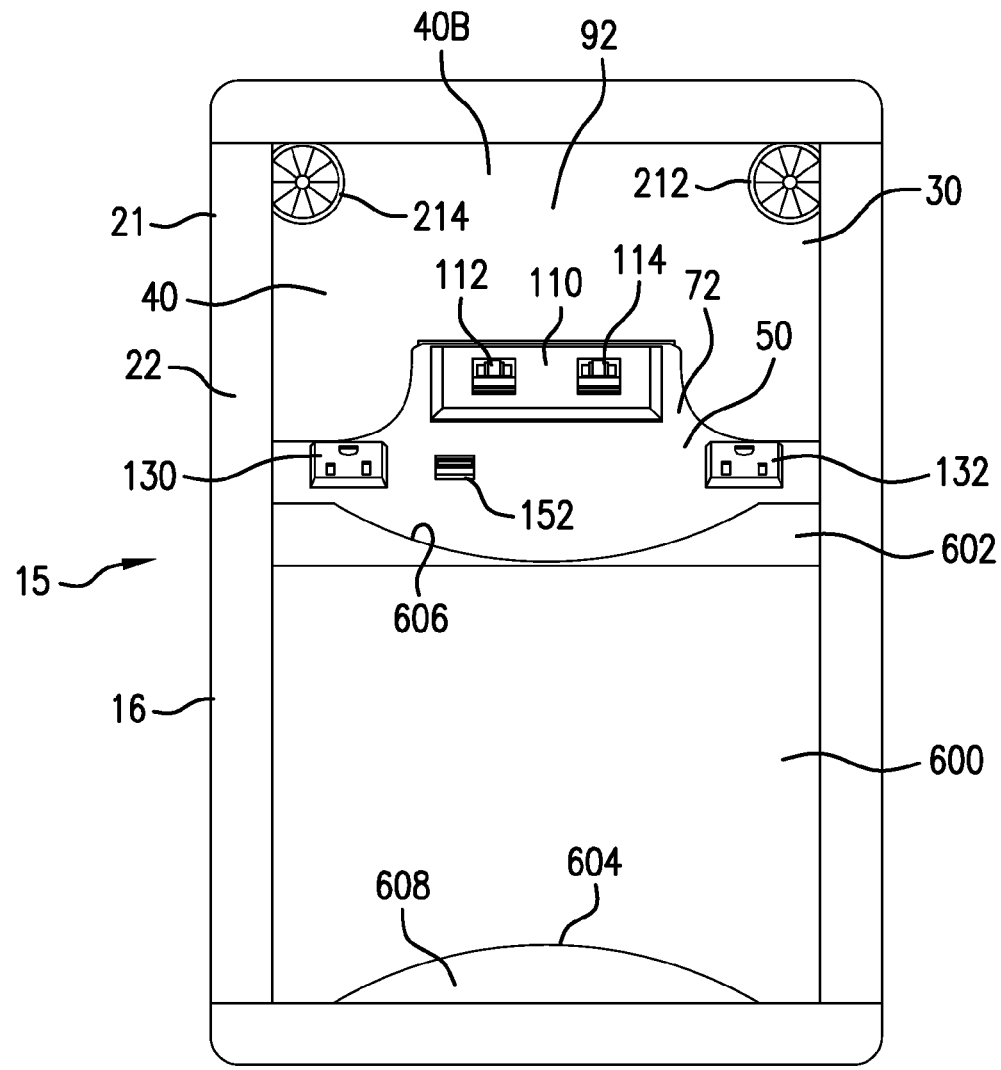
FIG. 5 is a top thereof, the view showing both overlapping cover members positioned to one side of the apparatus.

Referring to FIGS. 1-4, there is shown apparatus 15 for providing utility receptacles and cable at a selected location on a work station that has a work surface. Apparatus 15 generally comprises housing 16 which comprises lower portion 18 and upper portion 20. Upper portion 20 has flange 21 that extends about the perimeter of upper portion 20. Flange 21 has top side 22 and bottom side 24. Lower portion 18 comprises lengthwise walls 25 and 26, and widthwise walls 27 and 28. Lengthwise walls 25 and 26 and widthwise walls 27 and 28 are attached to and extend downwardly from upper peripheral portion 20. Widthwise wall 27 is attached to lengthwise walls 25 and 26, and widthwise wall 28 is attached to lengthwise walls 25 and 26. Housing 16 includes bottom panel 29 that is attached to lengthwise walls 25 and 26 and widthwise walls 27 and 28. Upper portion 20 includes top opening 30. Top opening 30 is bounded by flange 21. Housing 16 also has interior region 40 that is accessible through top opening 30. Receptacle support structure 50 is located within interior region 40 and attached to support members 52 and 54. Support members 52 and 54 are attached to widthwise walls 27 and 28, respectively. In a preferred embodiment, support members 52 and 54 are also attached to lengthwise walls 25 and 26. As shown in FIG. 4, the size, shape and location of support members 52 and 54 cooperate to form lower compartment 56 under receptacle support member 50.

Receptacle support structure 50 is generally centrally located within interior region 40 and comprises section 60 and section 62. Section 62 is contiguous with and angulated with respect to section 60. Receptacle support structure 50 further comprises section 70 and section 72. Section 72 is contiguous with and angulated with respect to section 70. Receptacle support structure 50 further comprises curved crest section 80 that is contiguous with sections 62 and 72. Receptacle support structure 50 further comprises sections 90 and 92 which are contiguous with sections 60 and 70, respectively. Sections 90 and 92 are both substantially flat. Section 90 is attached to support member 52 and section 92 is attached to support member 54. Sections 90 and 92 are substantially flat. The central location of receptacle support structure 50 divides interior region 40 into two equal portions or two halves 40A and 40B (see FIG. 6). Receptacle support structure 50 includes an interior 96.

Referring to FIGS. 1, 3, 4 and 5, apparatus 15 further comprises a plurality of utility receptacles that are attached or mounted to receptacle support structure 50. The plurality of utility receptacles comprises AC power receptacles, telephone jacks and USB ports. Specifically, telephone jack module 100 is attached to section 62 of receptacle support structure 50 and comprises telephone jacks 102 and 104. Similarly, telephone jack module 110 is attached to section 72 of receptacle support structure 50 and comprises telephone jacks 112 and 114. Telephone jacks 102, 104, 112 and 114 can be configured as any type of phone jack, including RJ-11, RJ-12, RJ-14, RJ-15, RJ-21X, RJ-25, RJ-31X, and RJ-48C. Each telephone jack 102, 104, 112 and 114 has electrical contacts on the rear thereof and which are positioned in interior 96 of receptacle support structure 50. Wires (not shown) are connected to these electrical contacts and to a telephone network such that each telephone jack 102, 104, 112 and 114 is connected to the telephone network. In an alternate embodiment, telephone jack modules 100 and 110 include Ethernet ports. AC power receptacles 120 and 122 are attached or mounted to section 62 of receptacle support structure 50. AC power receptacles 130 and 132 are attached or mounted to section 72 of receptacle support structure 50. AC power receptacles 120, 122, 130 and 132 are configured to provide a typical AC voltage (e.g. 115-120 VAC) that can be used to power computers, computer peripheral devices, and other equipment. Each AC power receptacle 120, 122, 130 and 132 has electrical contacts on the rear thereof and which are located within interior 96 of receptacle support structure 50. Electrical power cable 140 is electrically connected to the electrical contacts of AC power receptacles 120, 122, 130 and 132. Electrical power cable 140 has male plug portion 142 which is configured to be plugged into an AC power receptacle. Electrical power cable 140 extends through strain-relief member 143. Apparatus 15 further comprises dual powered USB ports 150 and dual powered USB ports 152. USB ports 150 and 152 are attached or mounted to sections 62 and 72, respectively, of receptacle support structure 50. USB ports 150 are electrically connected to USB circuit board 160 (see FIG. 8). USB circuit board 160 is in data signal communication with a computer network via wires (not shown). USB circuit board 160 is positioned within USB enclosure 165. The computer network may comprise computers, printers, servers, data storage, etc. Similarly, USB ports 152 are connected to a USB circuit board (not shown) which is located within a USB enclosure (not shown) and also connected to the computer network. Receptacle support member 50 further comprises a shield or divider member 170 that is located within interior 96 and attached to sections 62 and 72. Shield or divider member 170 separates AC power receptacles 120, 122, 130 and 132 from telephone jacks 102, 104, 112 and 114 and USB circuit boards. Shield or divider member 170 prevents RFI (radio frequency interference) or other EMI (electromagnetic interference) on electrical power cable 140 from being coupled to telephone jacks 102, 104, 112 and 114, USB ports 150 and 152 and the USB circuit boards. Shield or divider member 170 is fabricated from metal.

Figure 6:
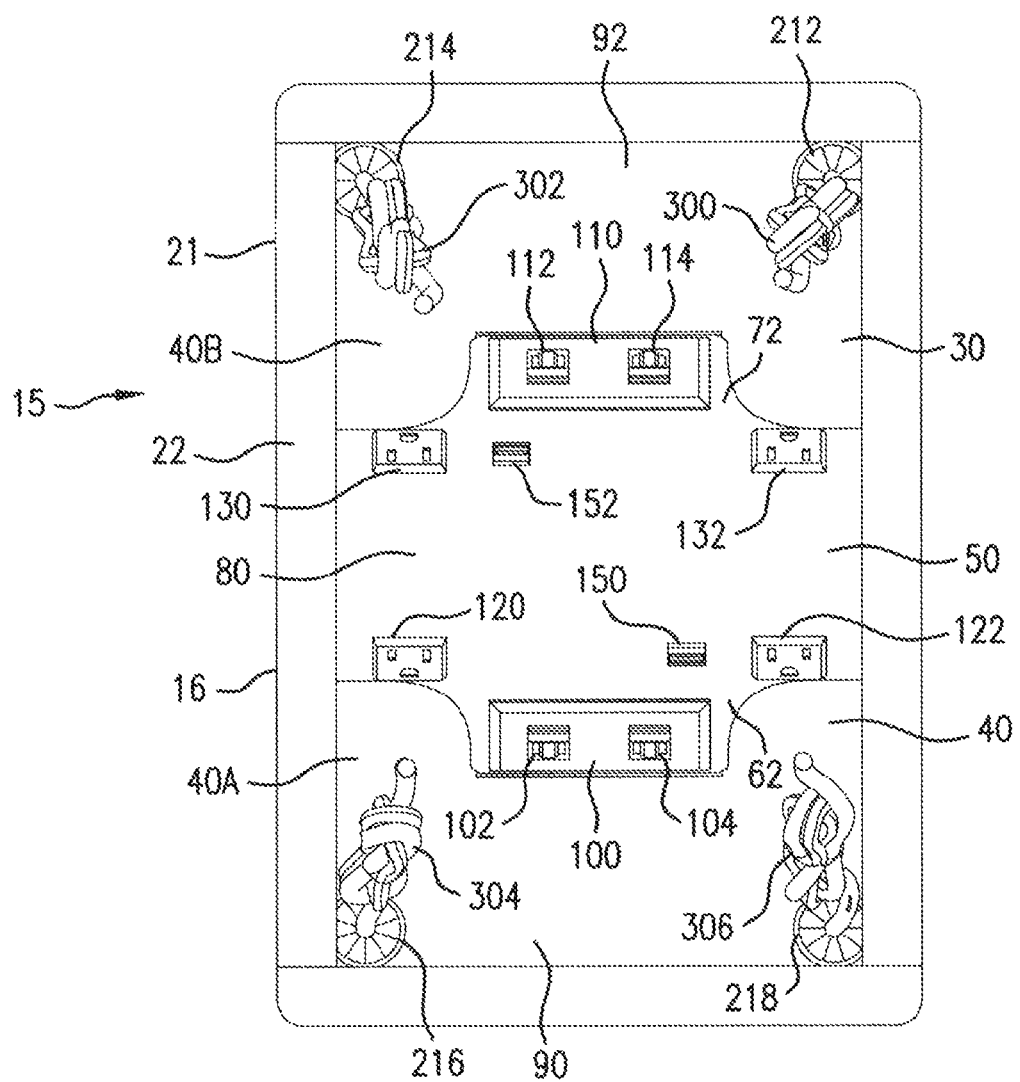
FIG. 6 is a top view thereof, the overlapping cover members not being shown so as to facilitate viewing of cables extending from through-holes in the receptacle support structure.
Figure 7:
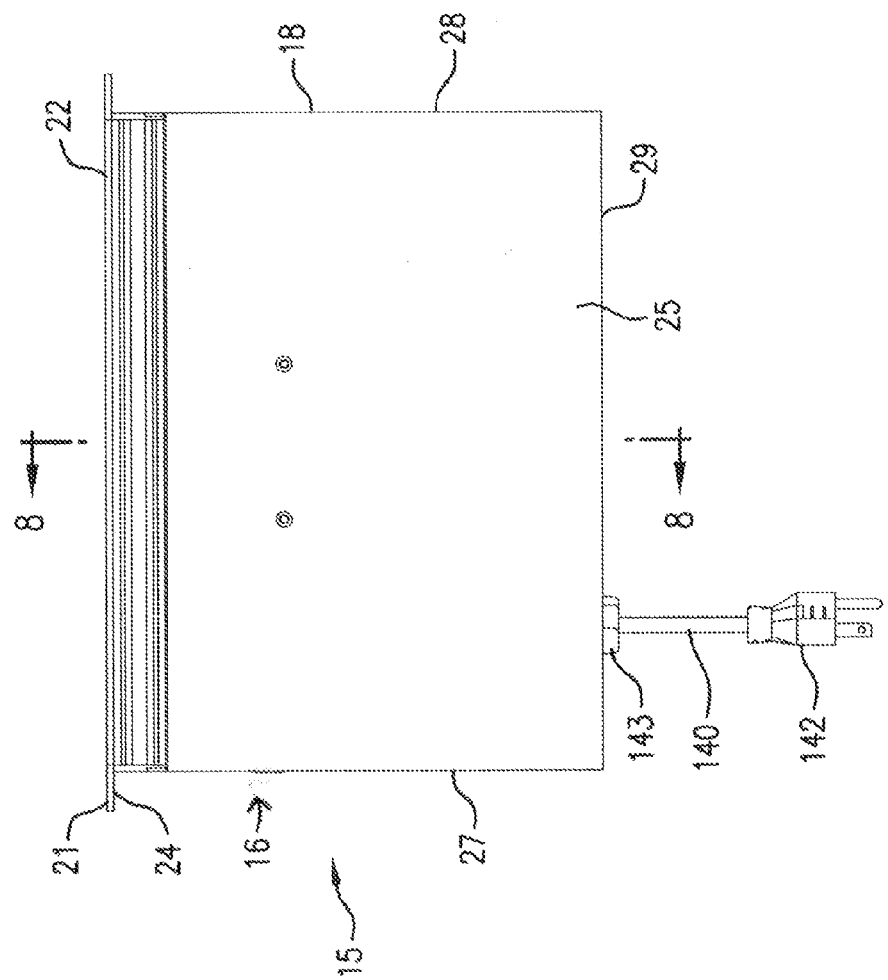
FIG. 7 is a side elevational view thereof.
Figure 10:
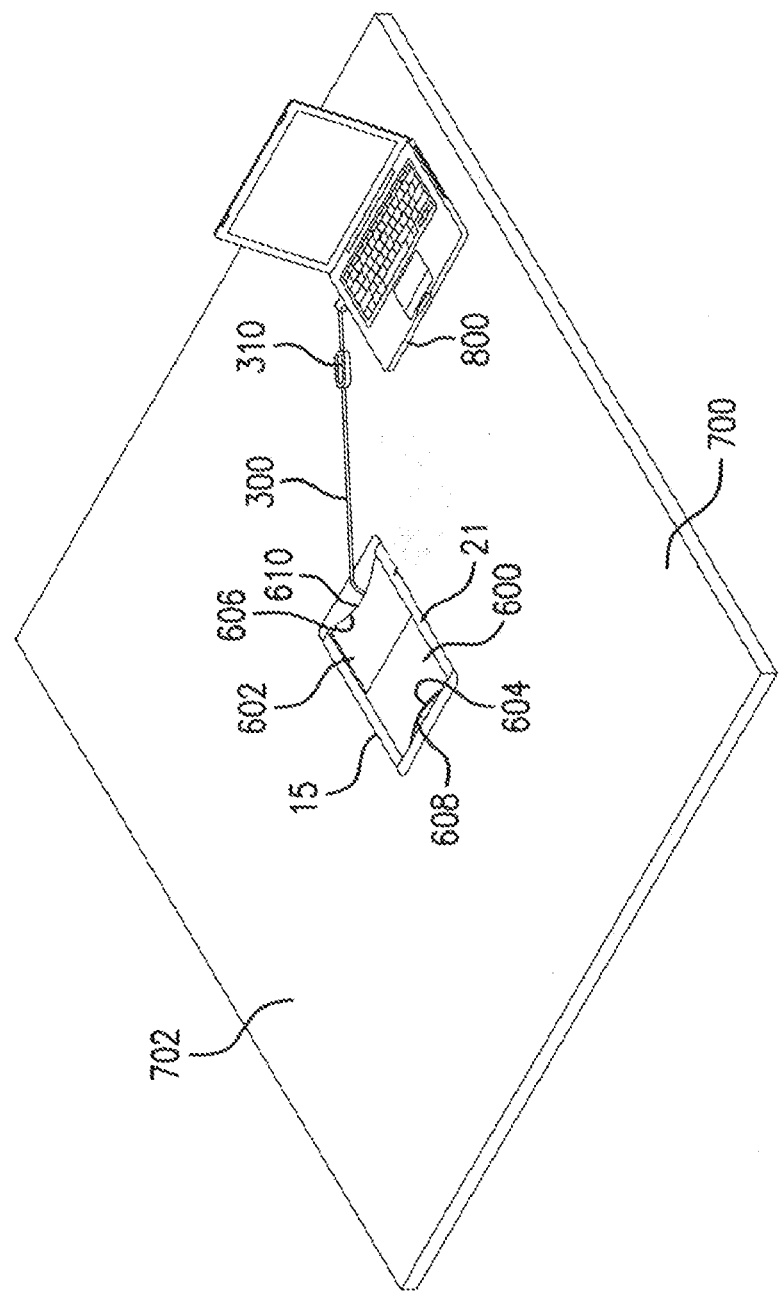
FIG. 10 is a perspective view of the apparatus of the present invention mounted to a workstation.

Referring to FIGS. 3, 4, 5, 6 and 8, sections 90 and 92 of receptacle support structure 50 have through-holes therein which lead to lower compartment 56. The aforementioned through-holes in sections 90 and 92 are located in the corners of interior region 40. Cable grommets 212, 214, 216 and 218 are positioned within the through-holes in sections 90 and 92. Apparatus 15 further comprises a plurality of HDMI cables 300, 302, 304 and 306 which extend through cable grommets 212, 214, 216 and 218, respectively. Each HDMI cable has a first HDMI connector at one end of the cable for connection to a HDMI signal source device such as a notebook, Blue-Ray player, personal computer, DSS receiver, etc. Each HDMI cable includes a second HDMI connector at the opposite end of the cable. The portion of each HDMI cable having the second HDMI connector is located in lower compartment 56. In one embodiment, each HDMI cable 300, 302, 304 and 306 is an Extron "Show Me" cable manufactured by Extron Electronics of Anaheim, Calif. Each cable 300, 302, 304 and 306 has a share button which when pressed, switches a connected HDMI signal source to a main presentation device. For example, as shown in FIG. 10, HDMI cable 300 has share button 310. These features are described in detail in the ensuing description. In FIG. 6, cables 300, 302, 304 and 306 are not in use, so they are shown bundled. Portion 40A of interior region 40 provides sufficient space for storing cables 304 and 306 when these cables are not in use. Similarly, portion 40B of interior region 40 provides sufficient space for storing cables 300 and 302 when these cables are not in use.

Apparatus 15 further comprises HDMI signal switching device 400 which is located within lower compartment 56. HDMI signal switching device 400 has HDMI input connectors 402, 404, 406 and 408, HDMI output connector 410 and remote and auto-input switching connector 412. The second HDMI connector of HDMI cable 300 is connected to HDMI input connector 402. The second HDMI connector of HDMI cable 302 is connected to HDMI input connector 404. The second HDMI connector of HDMI cable 304 is connected to HDMI input connector 406. Similarly, the second HDMI connector of HDMI cable 306 is connected to HDMI connector 408. In one embodiment, HDMI signal switcher device 400 is an Extron SW HDMI Switcher With EDID Minder #60-841-02 manufactured by Extron Electronics of Anaheim, Calif. Apparatus 15 further comprises an HDMI output connector 500 on bottom side 29. An HDMI cable (not shown) located in lower compartment 56 is connected between HDMI output connector 410 of HDMI signal switcher device 400 and HDMI connector 500. An external HDMI cable (not shown) is connected between HDMI output connector 500 and a main presentation display device (not shown).

Figure 8:
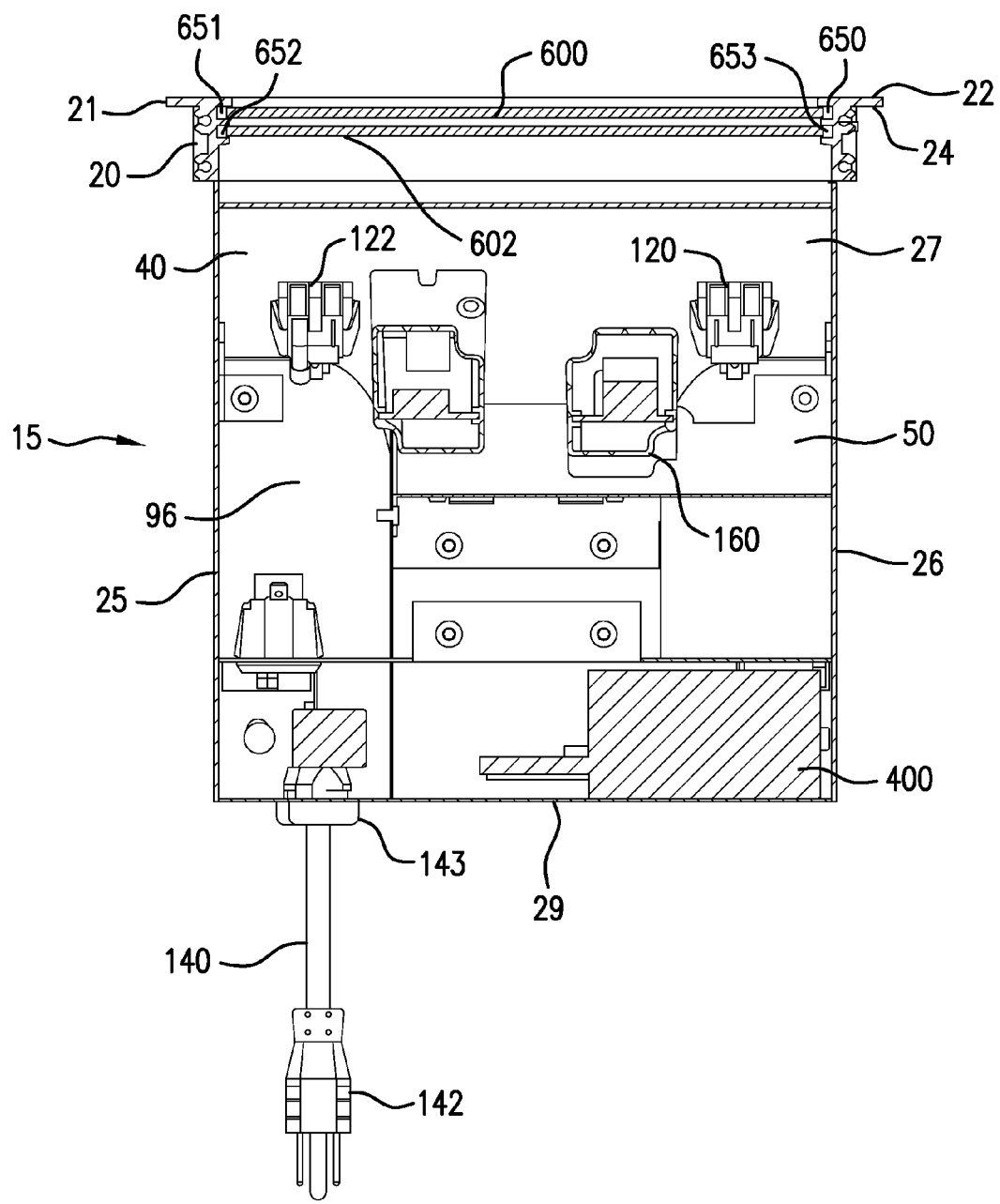
FIG. 8 is cross-sectional view taken along line 8-8 of FIG. 7.
Figure 9:
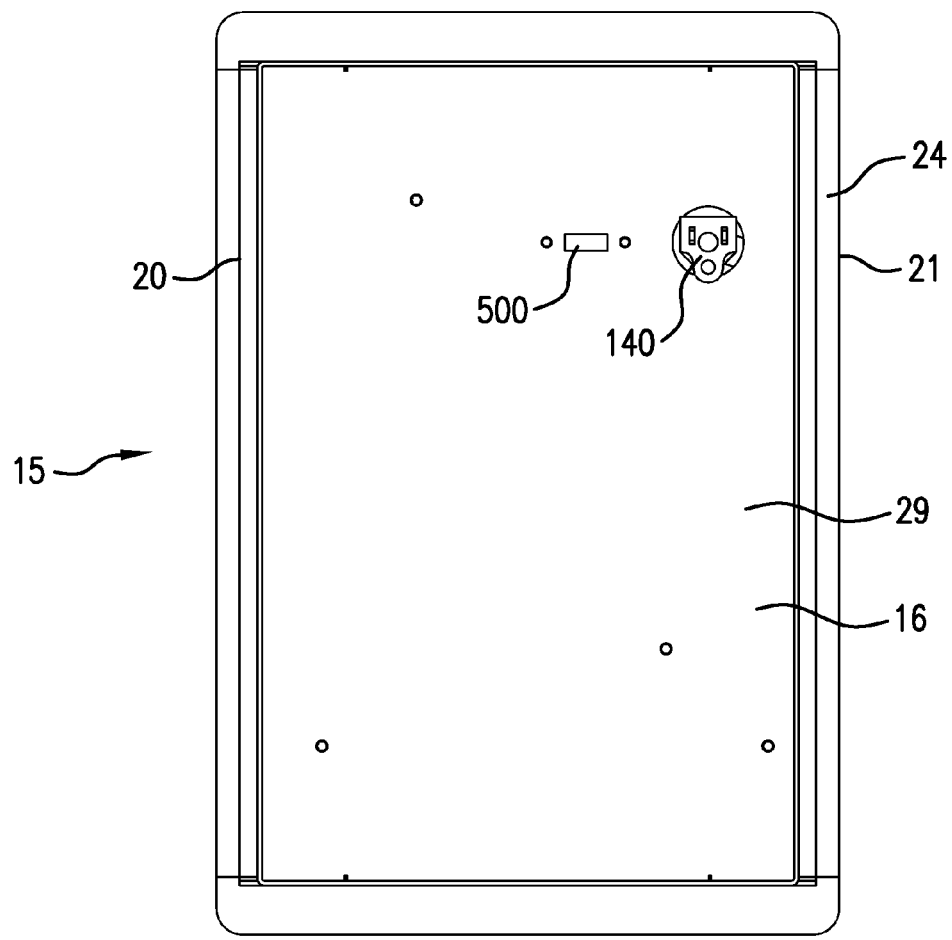
FIG. 9 is a bottom view thereof.

Referring to FIGS. 1, 4, 5, 6, 7, 8 and 10, apparatus 15 further comprises cover members 600 and 602 that are slidably attached to housing 16 and arranged in an overlapping configuration. Cover member 600 is positioned over cover member 602. Cover members 600 and 602 and be arranged to cover either substantially all of receptacle support structure 50, or only one portion of receptacle support structure 50. Thus, only one side of receptacle support structure 50 can be exposed at any one time. Cover members 600 and 602 have curved edges 604 and 606, respectively. Curved edge 604 provides space or gap 608 through which cables can pass. Similarly, curved edge 606 provides space or gap 610 through which cables can pass. Cables or wires can extending through spaces 608 and 610 when both cover members 600 and 602 are arranged to cover both sides of receptacle support structure 50 as shown in FIG. 10. Referring to FIG. 8, upper portion 20 of housing 16 includes tracks 650, 651, 652 and 653 that extend along the length of housing 16. Tracks 650 and 653 are above lengthwise wall 26. Tracks 651 and 652 are above lengthwise wall 25. Track 650 is above track 653. Track 651 is above track 652. Track 650 is aligned with track 651. Cover member 600 slides within tracks 650 and 651. Track 652 is aligned with track 653. Cover member 602 slides within tracks 652 and 653.

Referring to FIG. 10, apparatus 15 is configured to be used with work station 700. Work station 700 has a work surface 702, and a through-hole or opening that extends through the work station 700. The size of the through-hole in work station 702 is sized to allow lower portion 18 of housing 16 to fit therethrough but does not allow flange 21 to fit therethrough. As a result of this configuration, bottom side 24 of flange 21 contacts work surface 702 when apparatus 15 is mounted to work station 700 thereby preventing apparatus 15 from falling through the through-hole in work surface 702. In a preferred embodiment, the through-hole in work station 700 is precisely sized to minimize lateral movement of apparatus 15. HDMI cable 300 extends from interior region 40 through space or gap 608 and is connected to laptop computer 800. Pressing share button 310 creates a momentary contact closure which triggers the switcher device 400 to select the HDMI signals from laptop computer 800 for presentation on the main presentation display.

It is to be understood that the quantity and type of utility receptacles used in apparatus 15 can be varied and that the utility receptacles described in the foregoing description are examples. Portions of apparatus 15 can be fabricated from metals such as aluminum, stainless steel, steel, etc. Other suitable materials may be used.

In an alternate embodiment, USB ports 150 and 152 are not in data signal communication with a computer network, but instead, are configured as device charging USB ports that can be used to charge and power devices such as cell phones, smart phones, tablets, e-readers, digital recorders, cameras, iPads, iPods, MP3 players, etc. In such an embodiment, apparatus 15 comprises power conversion circuitry that converts 115-120 VAC to a relatively lower voltage that is provided at USB ports 150 and 152 for charging and powering the aforementioned devices (e.g. Smart Phone, iPad, iPods, etc.).

Figure 11:
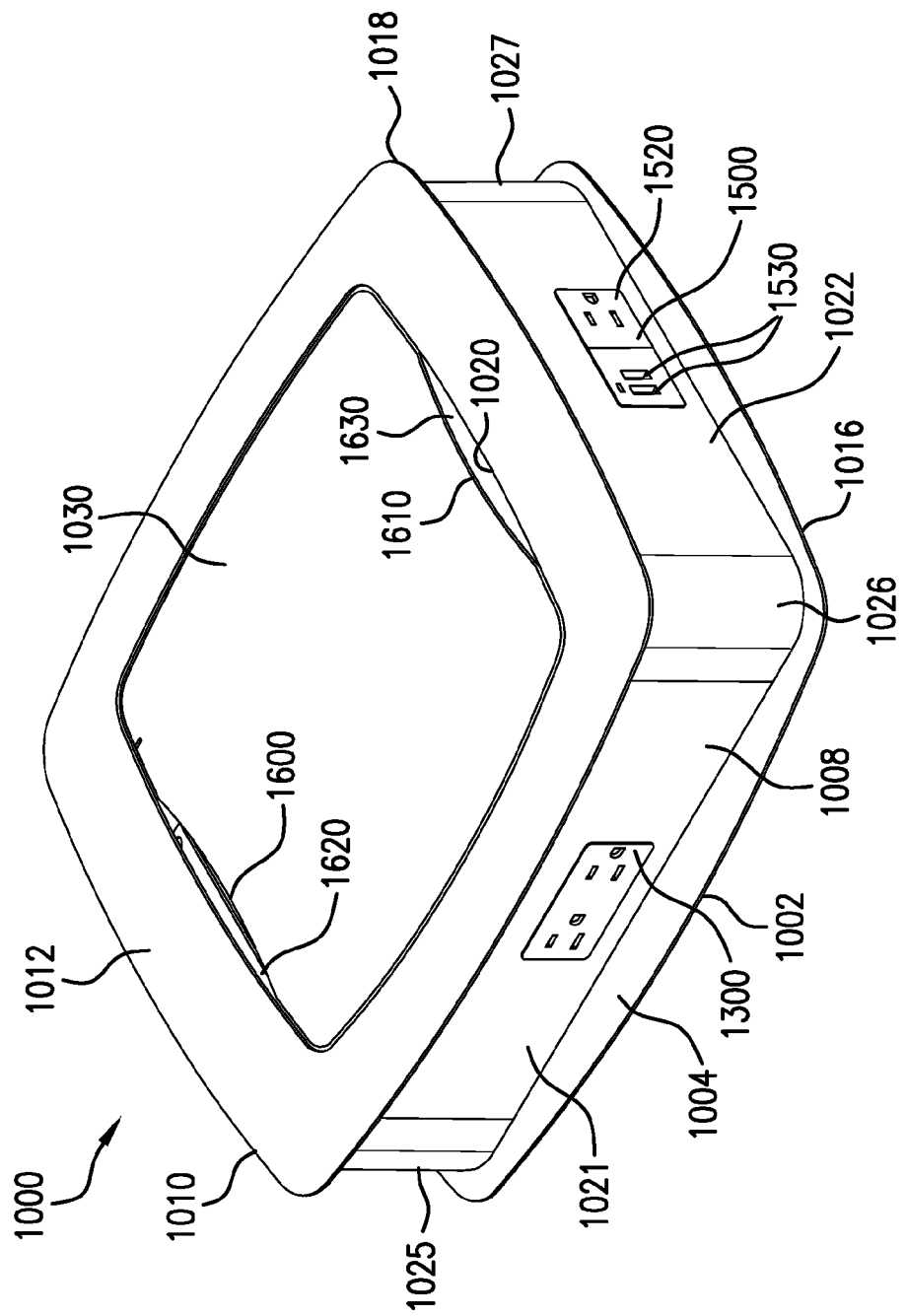
FIG. 11 is a perspective view of an apparatus for providing utility receptacles and cables at a selected location on a workstation in accordance with another embodiment of the present invention.
Figure 12:
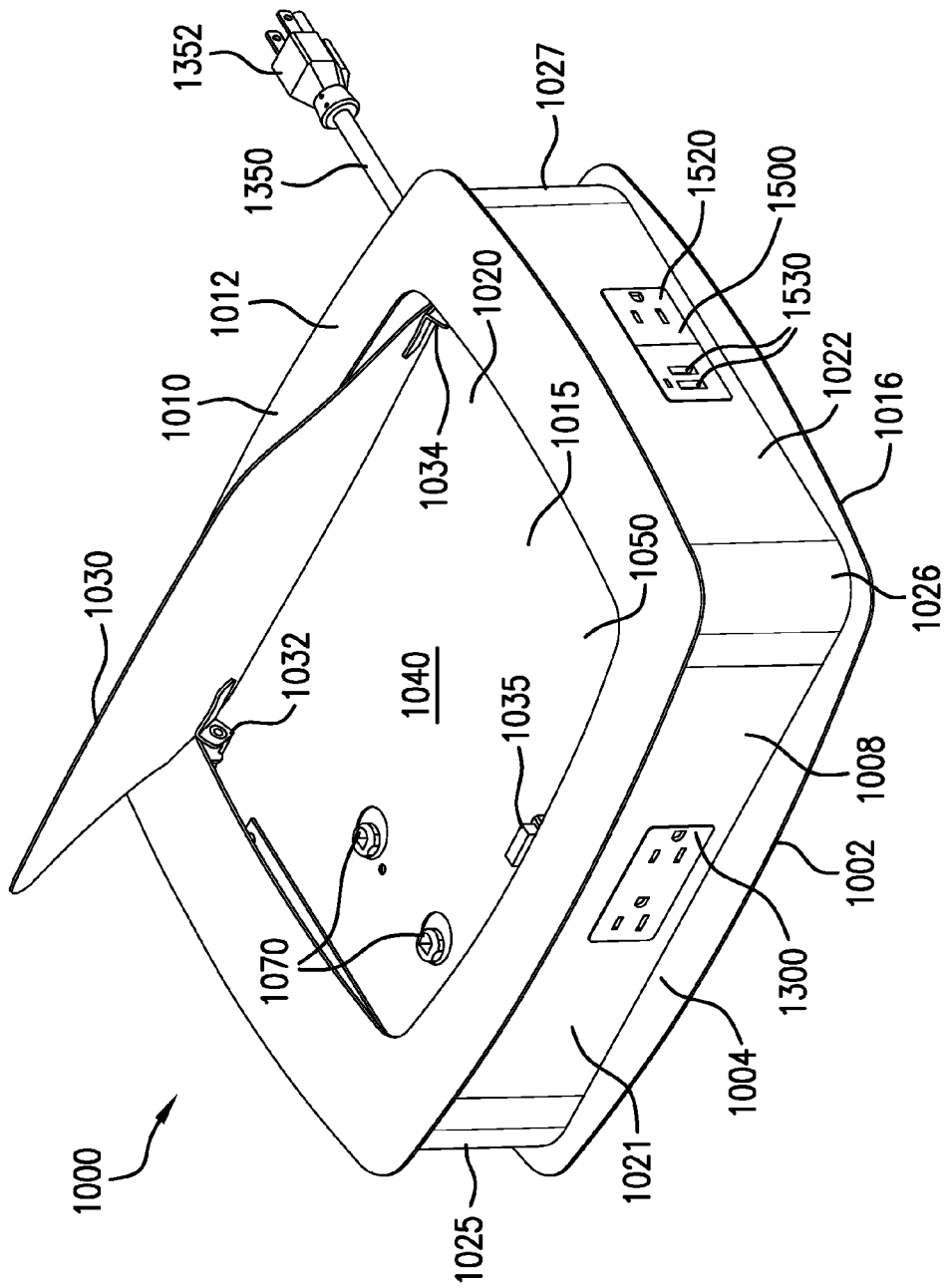
FIG. 12 is another perspective view thereof, a lid of the apparatus being shown in the open position.
Figure 13:
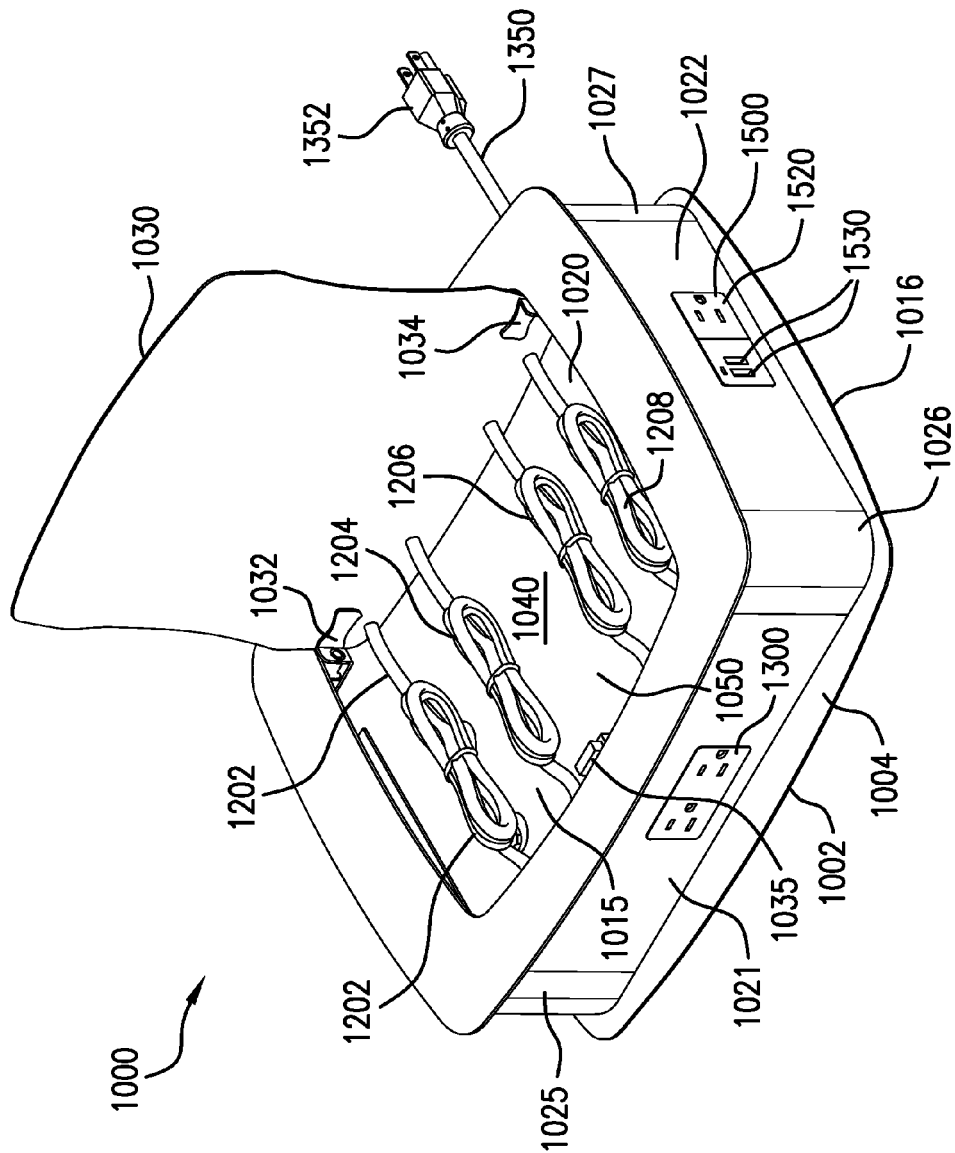
FIG. 13 is a further perspective view thereof, the lid being shown in the open position so as to facilitate viewing of a plurality of HDMI cables within the interior of the apparatus.

Referring to FIGS. 11-18, there is shown an apparatus for providing utility receptacles and cables at a selected location on a workstation in accordance with another embodiment of the present invention. Apparatus 1000 is a portable but is also configured to be attached to a work surface. Apparatus 1000 comprises bottom panel member 1002 which has top side 1004 and bottom side 1006. Apparatus 1000 further comprises wall structure 1008 that is attached to top side 1004 of bottom panel member 1002. Apparatus 1000 also includes top panel member 1010. Top panel member 1010 has top side 1012 and bottom side 1014. Top panel member 1010 includes opening 1020 therein. Wall structure 1008 is attached to bottom side 1014 of top panel member 1010. As shown in FIGS. 11-13, wall structure 1008 is between top panel member 1010 and bottom panel member 1002 and defines interior region 1015. In a preferred embodiment, wall structure 1008 is substantially perpendicular to bottom panel member 1002 and top panel member 1010. Bottom panel member 1002 is substantially parallel to top panel member 1010. In one embodiment, top side 1012 of top panel member 1010 is substantially flat. Preferably, bottom panel member 1002 and top panel member 1010 have substantially the same size and perimeter. Bottom panel member 1002 has perimetrical edge 1016 and top panel member 1010 has perimetrical edge 1018. In one embodiment, bottom panel member 1002, wall structure 1008, and top panel member 1010 are fabricated from metal, e.g. steel, aluminum, iron, etc. However, other suitable materials may be used, e.g. plastic, resin, etc.

Any suitable technique may be used to attach wall structure 1008 to top side 1004 of bottom panel member 1002 and bottom side 1014 of top panel member 1010, such as screws, rivets or other fastening devices. In one embodiment, wall structure 1008 is integrally formed with top panel member 1010 and bottom panel member 1002 is removably attached to wall structure 1008. Wall structure 1008 has a perimeter that is less than the perimeters of bottom panel member 1002 and top panel member 1010 so that wall structure 1008 is off-set from perimetrical edges 1016 and 1018. Wall structure 1008 comprises straight sections 1021, 1022, 1023 and 1024, and rounded corner sections 1025, 1026, 1027 and 1028.

As shown in FIGS. 11-13, apparatus 1000 further comprises lid 1030 that is pivotally attached to top panel member 1010. Hinges 1032 and 1034 are attached to top panel member 1010 and lid 1030. Lid locking device 1035 is attached to top panel member 1010. In one embodiment, lid locking device 1035 is a magnetic locking device and lid 1030 is fabricated from a ferrous metal (e.g. steel). Apparatus 1000 further comprises interior panel 1040 that is horizontally oriented. In one embodiment, interior panel 1040 is attached to wall structure 1008. Interior panel 1040 divides interior region 1015 into upper compartment 1050 and lower compartment 1060. Compartment 1060 is shown in phantom in FIG. 17. Interior panel 1040 has a plurality of through-holes that lead to lower compartment 1060. Strain reliefs 1070 are positioned in the through-holes in interior panel 1040.

Figure 17:
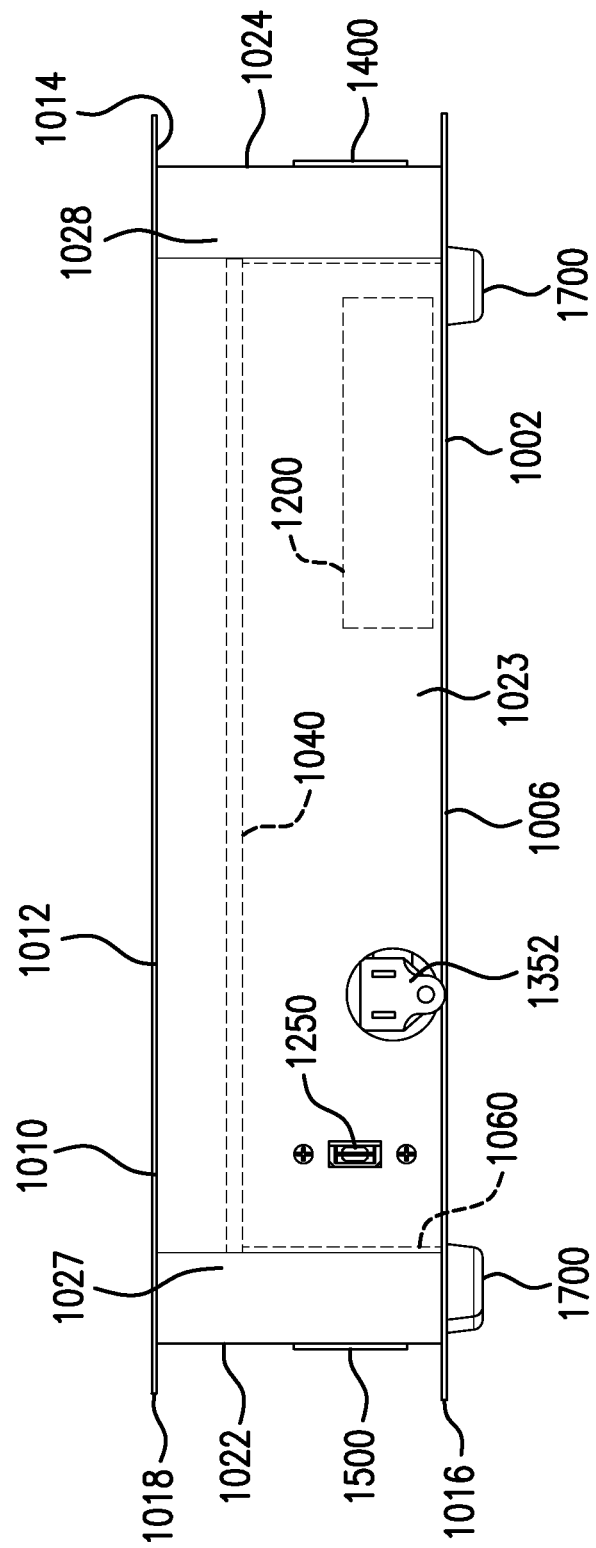
FIG. 17 is a rear view thereof.
Figure 18:
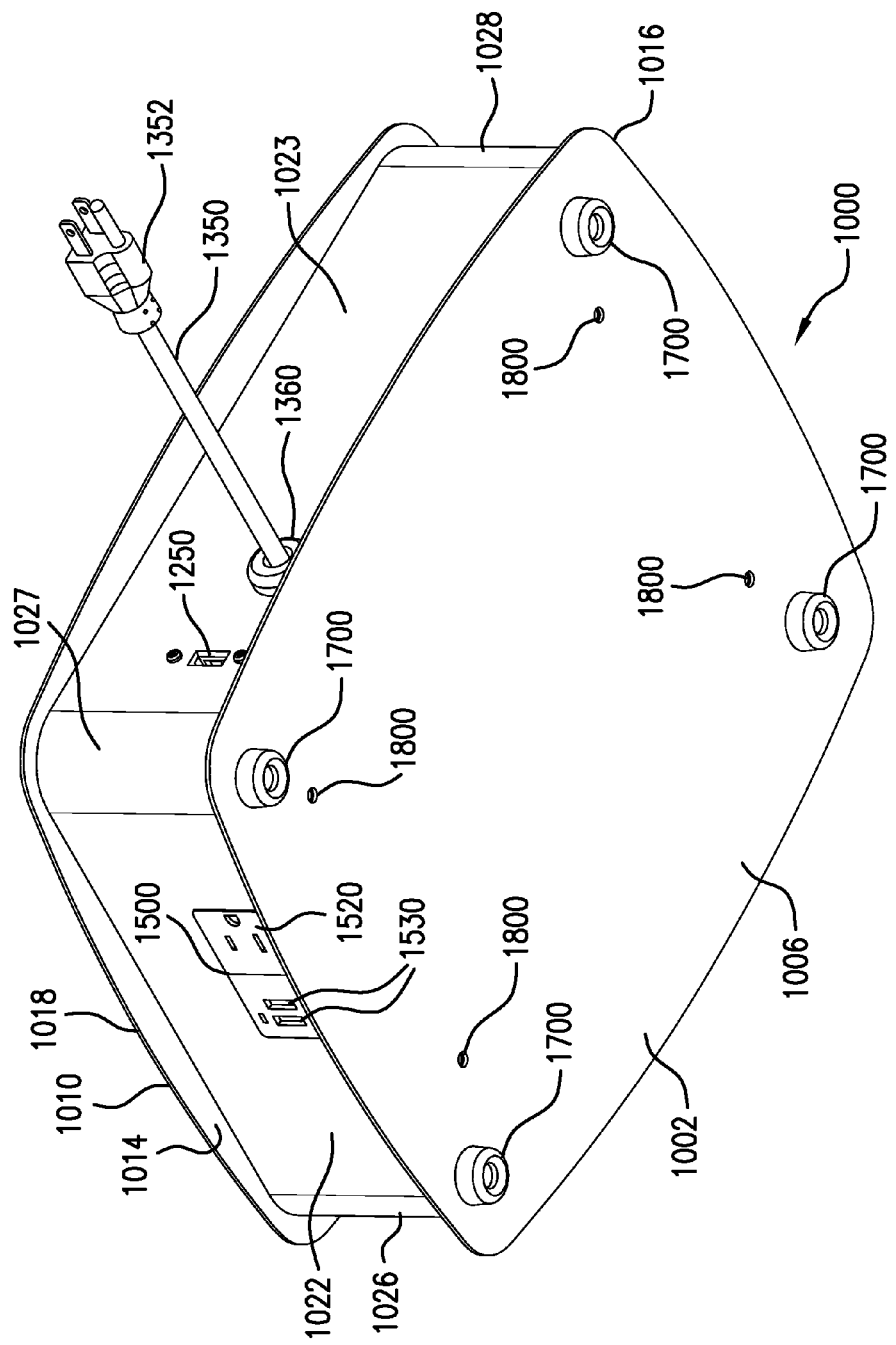
FIG. 18 is a bottom perspective view thereof.

Referring to FIGS. 17 and 18, apparatus 1000 further comprises HDMI signal switcher device 1200 which is located in lower compartment 1060. HDMI signal switcher device 1200 is shown in phantom in FIG. 17. In a preferred embodiment, HDMI signal switcher device 1200 has the same configuration and function as HDMI signal switcher device 400 described in the foregoing description. Preferably, HDMI signal switcher device 1200 is an Extron SW HDMI Switcher With EDID Minder #60-841-02. Apparatus 1000 further comprises a plurality of HDMI cables 1202, 1204, 1206 and 1208. Each HDMI cable has a first HDMI connector at one end of the cable for connection to a HDMI signal source device such as a notebook, Blue-Ray player, personal computer, DSS receiver, etc. Each HDMI cable includes a second HDMI connector that is on the opposite end of the cable and located in lower compartment 1060 where it is connected to a corresponding input of HDMI signal switcher device 1200. In one embodiment, each HDMI cable 1202, 1204, 1206 and 1208 is an Extron "Show Me" cable manufactured by Extron Electronics of Anaheim, Calif., which was described in the foregoing description. Each HDMI cable 1202, 1204, 1206 and 1208 passes through a corresponding one of strain reliefs 1070. Referring to FIGS. 17 and 18, apparatus 1000 further comprises HDMI output connector 1250 that is connected to the HDMI output (not shown) of HDMI signal switcher device 1200 by a HDMI cable (not shown) located in lower compartment 1060. An external HDMI cable (not shown) is connected between HDMI output connector 1250 and a main presentation display device (not shown). Each HDMI cable 1202, 1204, 1206 and 1208 has a share button which when pressed, switches a connected HDMI signal source device (e.g. Blue-ray player) to the main presentation device. The share button has the same function and configuration as the share button 310 described in the foregoing description (see FIG. 10). Specifically, pressing the share button creates a momentary contact closure which triggers the HDMI signal switcher device 1200 to select the HDMI signals from a HDMI signal source device for presentation on the main presentation display.

Referring to FIGS. 11-13, and 15, 16 and 18, apparatus 1000 further comprises electrical power receptacle 1300 in section 1021 of wall structure 1008. Electrical power receptacle 1300 is located in lower compartment 1060 and protrudes through a generally rectangular shaped opening in section 1021. In one embodiment, electrical power receptacle 1300 is an AC power receptacle that is configured to provide typical AC voltages (e.g. 115-120 VAC) used to power devices such as computers, laptops, computer printers, monitors of computer displays. In a preferred embodiment, electrical power receptacle 1300 is removably attached to section 1021 with a pair of fastener devices (not shown) located within lower compartment 1060. Any suitable technique known in the art may be used to attach electrical power receptacle 1300 to section 1021. Electrical power receptacle 1300 comprises electrical contacts (not shown) that are located in lower compartment 1060 and configured to be electrically connected to electrical power cable 1350. Electrical power cable 1350 includes male plug 1352 which is configured to be plugged into an electrical power source, such as an AC power receptacle that provides AC voltages (e.g. 115-120 VAC). Electrical power cable 1350 extends through strain relief 1360 in section 1023 of wall structure 1008. Electrical power cable 1350 also provides electrical power to HDMI signal switcher device 1200.

Apparatus 1000 further comprises a pair of identically constructed electrical power devices 1400 and 1500 that are mounted or attached to sections 1024 and 1022, respectively, of wall structure 1008 and located in lower compartment 1060. Any suitable technique and fasteners may be used to attached electrical power devices 1400 and 1500 to sections 1024 and 1022, respectively. Since electrical power devices 1400 and 1500 are identically constructed, only electrical power device 1500 is discussed in detail. Electrical power device 1500 comprises electrical power receptacle 1520 and device charging ports 1530. Electrical power receptacle 1520 and device charging ports 1530 protrude through a generally rectangular shaped opening in section 1022 of wall structure 1008. Electrical power cable 1350 also provides electrical power to electrical power device 1500. Electrical power receptacle 1520 is configured to provide 110-120 VAC. However, it to be understood that electrical power device 1500 may be configured so that electrical power receptacle 1520 provides a different voltage. Electrical power device 1500 comprises power conversion circuitry that converts 115-120 VAC to a relatively lower voltage that is provided at device charging ports 1530. This relatively lower voltage is used to charge and power devices such as cell phones, smart phones, tablets, e-readers, digital recorders, cameras, iPads, iPods, MP3 players, etc. The devices to be charged, e.g. smart phone, are plugged into device charging ports 1530. In a preferred embodiment, each device charging port 1530 comprises a USB charging port. In one embodiment, electrical power device 1500 is configured so that each device charging port 1530 provides 5V DC @ 700 mA (milliamperes). However, it is to be understood that electrical power device 1500 can be configured so that each device charging port 1530 provides other voltage levels and currents. For example, in an alternate embodiment, each device charging port 1530 is a USB charging port that provides 5V DC @ 500 mA. In one embodiment, each electrical power device 1400 and 1500 is a commercially available Combination USB Charger With Tamper Resistant Receptacle-TR7740, manufactured by Cooper Wiring Devices of Peachtree City, Ga.

Figure 14:
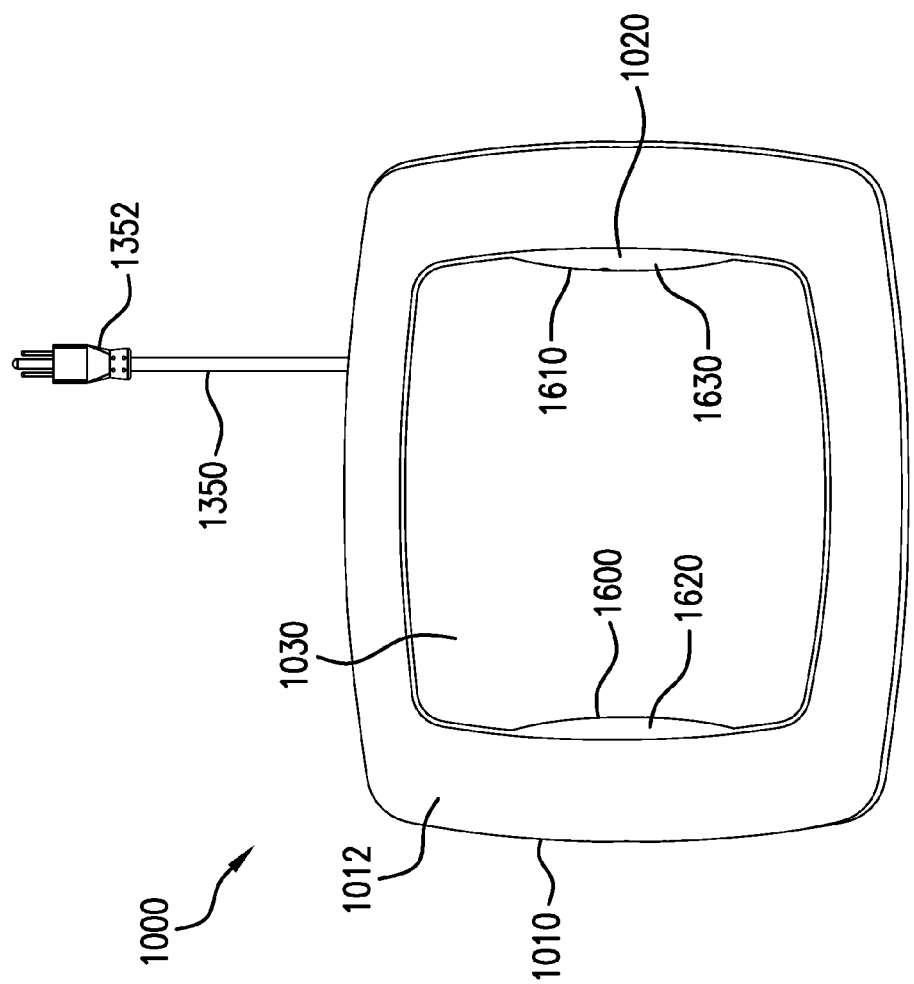
FIG. 14 is a top view thereof.
Figure 15:
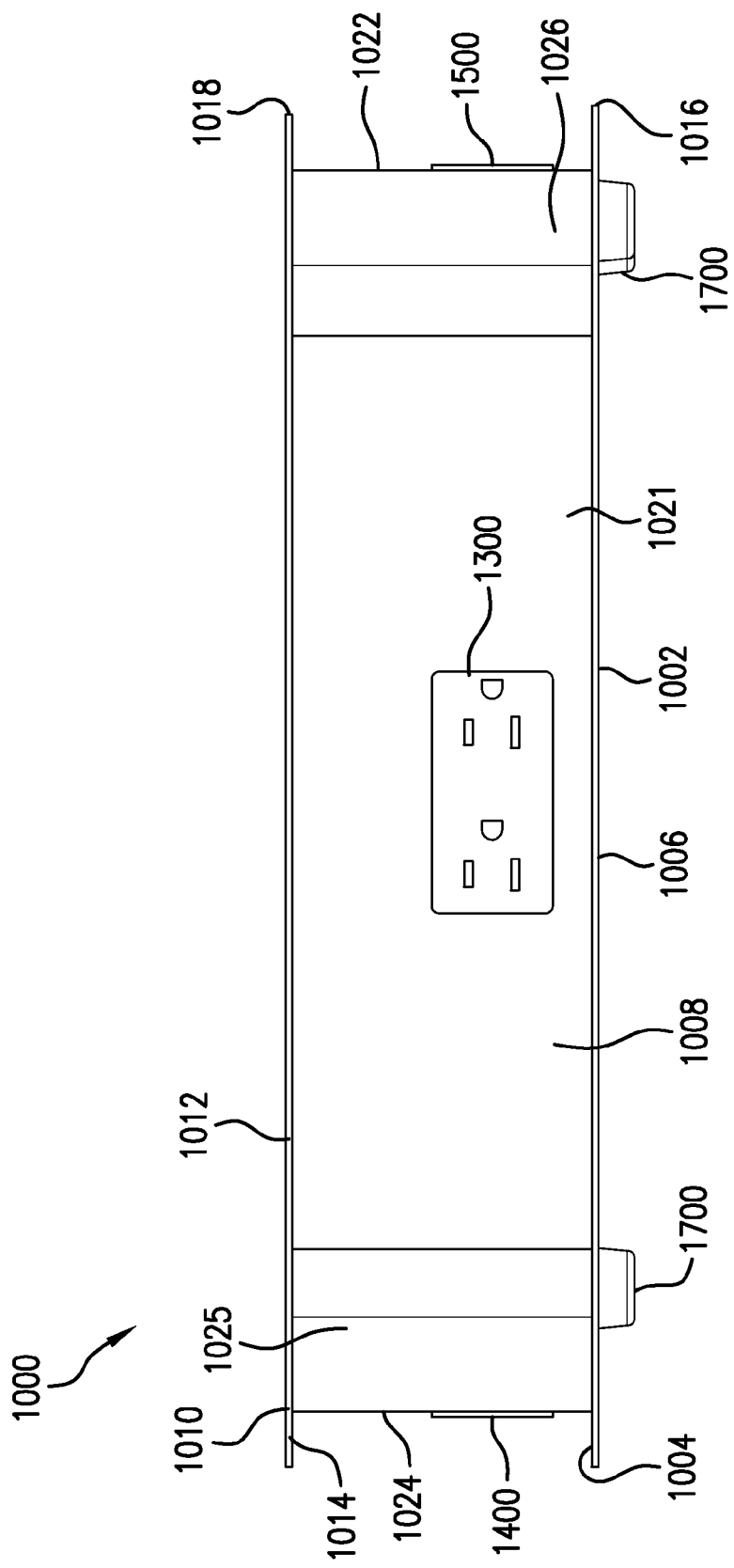
FIG. 15 is a front thereof.
Figure 16:
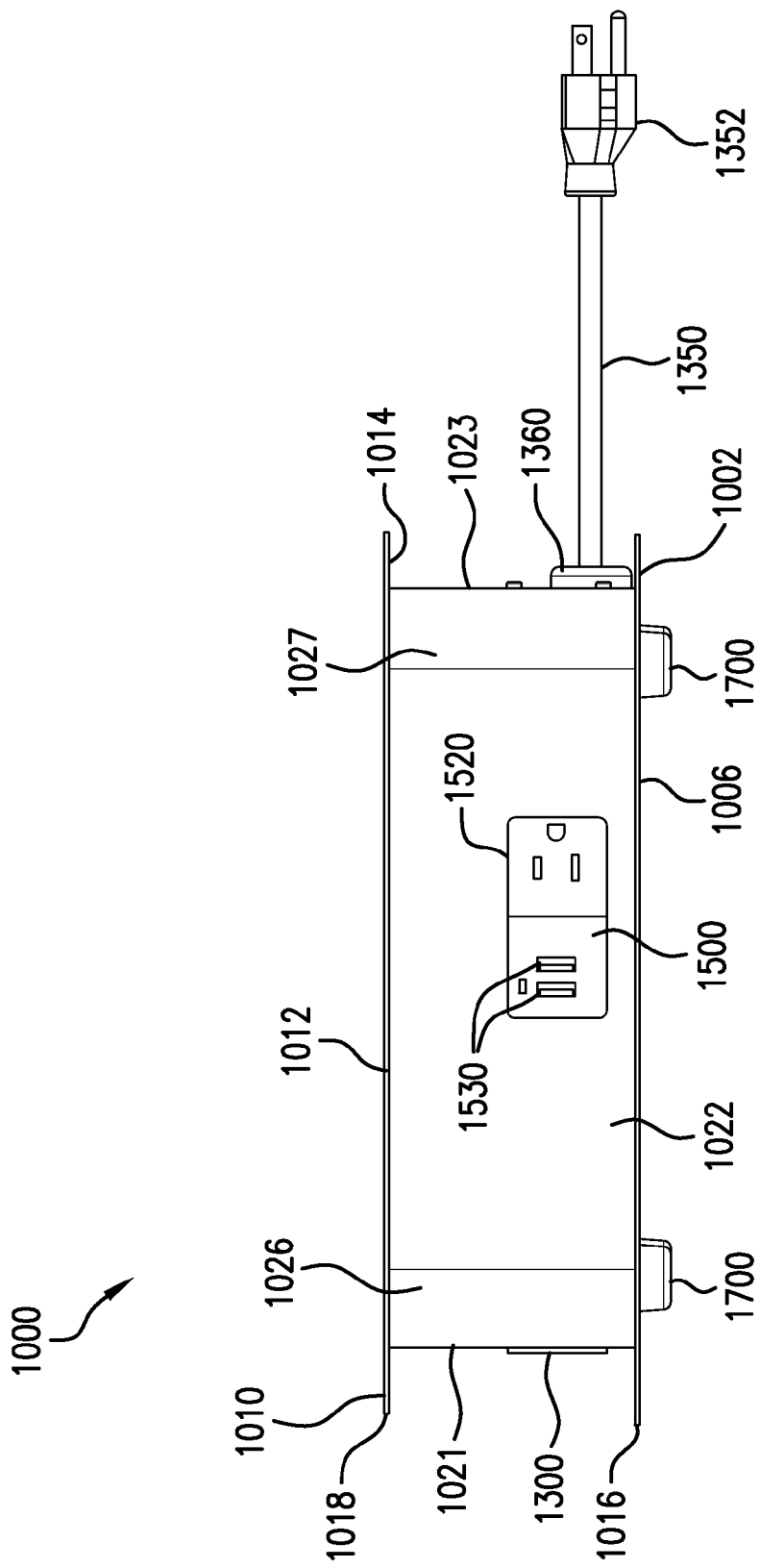
FIG. 16 is a side elevational view thereof.

Referring to FIGS. 11, 13 and 14, lid 1030 has curved edges 1600 and 1610. When lid 1030 is closed, curved edge 1600 provides space or gap 1620 through which any of HDMI cables 1202, 1204, 1206 and 1208 can pass. Similarly, curved edge 1610 provides space or gap 1630 through which HDMI cables 1202, 1204, 1206 and 1208 can pass when lid 1030 is closed. Lid locking device 1035 is attached to the portion of bottom side 1014 of top panel member 1010 that is within upper compartment 1050.

Referring to FIGS. 15-18, apparatus 1000 includes feet members 1700 which are attached to bottom side 1006 of bottom panel member 1002. Feet members 1700 are fabricated from any suitable material such as rubber, neoprene rubber, resin, plastic, polyvinylchloride, etc. Apparatus 1000 further comprises a plurality of threaded nuts 1800 embedded in bottom side 1006. Each threaded nut 1800 is configured to receive a complementary screw (not shown). Such an embodiment provides a user with the option of using the threaded nuts 1800 and the complementary screws (not shown) to removably attach apparatus 1000 to an article of furniture such as a table, desk, work bench, work station, conference table, etc. In such an embodiment, the complementary screws are inserted through corresponding through-holes in the article of furniture and engaged with threaded nuts 1800. In such an embodiment, the article of furniture has a through-hole sized to allow electrical power cable 1350 to pass therethrough. In one embodiment, each threaded nut 1800 is fabricated from brass. However, other suitable metals can be used to fabricated threaded nut 1800.

Apparatus 1000 is portable, light in weight and can be conveniently placed on desks, conference tables, work stations, work benches, etc. Apparatus 1000 can be configured to have any suitable size.

Although apparatus 1000 is described as having four HDMI cables, it is to be understood that apparatus 1000 may be configured to have more than or less than four HDMI cables. In such an embodiment, HDMI signal switcher device 1200 is modified to have a different number of HDMI signal inputs. In an alternate embodiment, apparatus 1000 can be configured so that wall structure 1008 has more than four sections.

Referring to FIGS. 19-22, there is shown an apparatus for providing utility receptacles and cables at a selected location on a workstation in accordance with another embodiment of the present invention. Apparatus 2000 is portable but is also configured to be attached to a work surface. Apparatus 2000 has generally the same structure as apparatus 1000 except that apparatus 2000 has a different lid 2030 and also includes feet members 3000. Apparatus 2000 also is configured to be clamped to an article of furniture such as a conference table, work table, work station, work bench, etc. This feature is discussed in detail in the ensuing description. Apparatus 2000 comprises bottom panel member 2002 which has top side 2004 and bottom side 2006. Apparatus 2000 further comprises wall structure 2008 that is attached to top side 2004 of bottom panel member 2002. Wall structure 2008 has the same purpose and function as wall structure 1008 of apparatus 1000. Apparatus 2000 also includes top panel member 2010.

Figure 19:
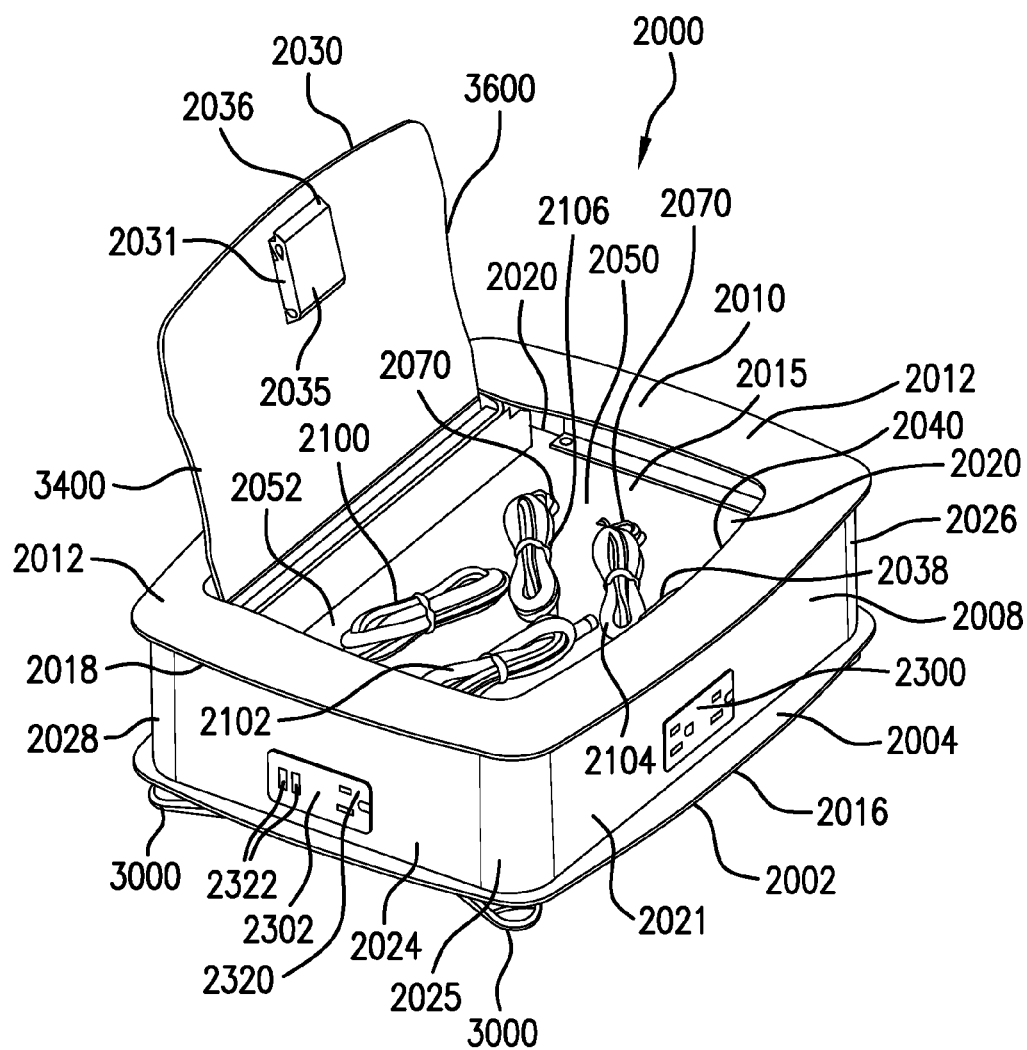
FIG. 19 is a perspective view of an apparatus for providing utility receptacles and cables at a selected location on a workstation in accordance with a further embodiment of the present invention, the view showing a lid of the apparatus in an open position.
Figure 21:
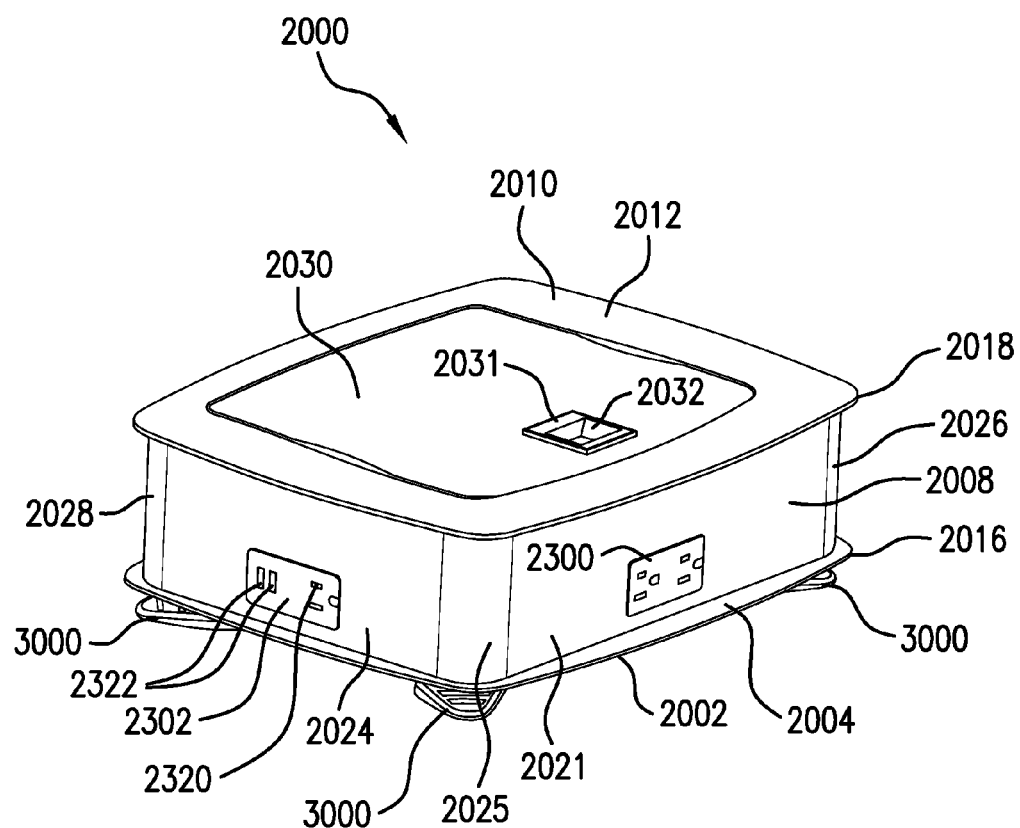
FIG. 21 is another perspective view of the apparatus of FIG. 19, the view showing the lid in the closed position.

Top panel member 2010 has top side 2012 and bottom side 2014. Wall structure 2008 defines interior 2015. Top panel member 2010 includes opening 2020 therein that provides access to interior 2015. Top panel member 2010 includes inner edge 2040 that extends about opening 2020. Wall structure 2008 is attached to bottom side 2014 of top panel member 2010. As shown in FIGS. 19 and 21, wall structure 2008 is between top panel member 2010 and bottom panel member 2002. In a preferred embodiment, wall structure 2008 is substantially perpendicular to bottom panel member 2002 and top panel member 2010. Bottom panel member 2002 is substantially parallel to top panel member 2010. In one embodiment, top side 2012 of top panel member 2010 is substantially flat. Preferably, bottom panel member 2002 and top panel member 2010 have substantially the same size and perimeter. Bottom panel member 2002 has perimetrical edge 2016 and top panel member 2010 has perimetrical edge 2018. In one embodiment, bottom panel member 2002, wall structure 2008, and top panel member 2010 are fabricated from metal, e.g. steel, aluminum, iron, etc. However, other suitable materials may be used, e.g. plastic, resin, etc.

Any suitable technique may be used to attach wall structure 2008 to top side 2004 of bottom panel member 2002 and bottom side 2014 of top panel member 2010, such as screws, rivets or other fastening devices. In one embodiment, wall structure 2008 is integrally formed with top panel member 2010 and bottom panel member 2002 is removably attached to wall structure 2008. Wall structure 2008 has a perimeter that is less than the perimeters of bottom panel member 2002 and top panel member 2010 so that wall structure 2008 is off-set from perimetrical edges 2016 and 2018. Wall structure 2008 comprises straight sections 2021, 2022, 2023 and 2024, and rounded corner sections 2025, 2026, 2027 and 2028.

Figure 20:
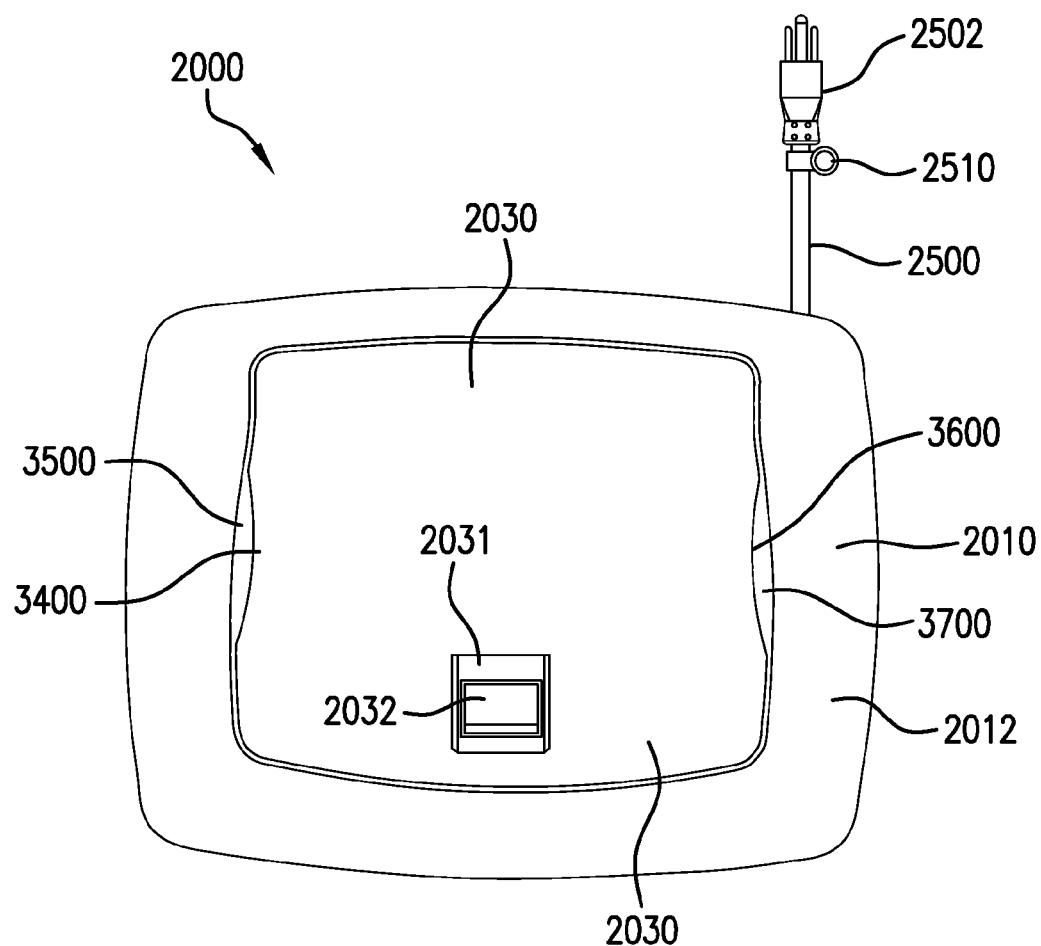
FIG. 20 is a top view of the apparatus of FIG. 19.

As shown in FIGS. 19-21, apparatus 2000 further comprises lid 2030 that is positioned within opening 2020 and is pivotally attached to top panel member 2010. Any suitable technique can be used to pivotally attach lid 2030 to top panel member 2010. In one embodiment, hinges, similar to hinges 1032 and 1034 (see FIG. 13), are used to pivotally attach lid 2030 to top panel member 2010. Apparatus 2000 further comprises lid locking device 2031 that is mounted or attached to top panel member 2010 and positioned within an opening in lid 2030. In this embodiment, lid locking device 2031 comprises movable member 2032 located on the exterior side of lid 2030. A user can slide movable member 2032 to a first position to open lid 2030 and to a second position to lock lid 2030. Lid locking device 2031 includes section 2035 that is on the interior side of lid 2030. Section 2035 has lip portion 2036. As shown in FIG. 19, apparatus 2000 includes lip contact member 2038 that is attached to inner edge 2040 of top panel member 2010. When the user wants to close lid 2030, the user first lowers lid 2030 so the lid 2030 is positioned as shown in FIGS. 20 and 21. The user then slides movable member 2032 of lid locking device 2031 to the first position so that lip portion 2036 is positioned under lip contact member 2038 in order to prevent lid member 2032 from opening. In a preferred embodiment, lip portion 2036 frictional slides against lip contact member 2038.

Referring to FIG. 19, apparatus 2000 further comprises horizontally oriented interior panel 2050. In one embodiment, interior panel 2050 is attached to wall structure 2008. Interior panel 2050 performs the same function as interior panel 1040 shown in FIGS. 12 and 17. Interior panel 2050 divides interior region 2015 into upper compartment 2052 and a lower compartment that is below upper compartment 2052 and is substantially the same as lower compartment 1060 (see FIG. 17). Interior panel 2050 has a plurality of through-holes that lead to the lower compartment. Strain reliefs 2070 are positioned in these through-holes. Apparatus 2000 further comprises a HDMI signal switcher device (not shown) that has the same configuration as signal switcher device 1200 (see FIG. 17) and signal switcher device 400 (see FIG. 8) which were described in the foregoing description. The signal switcher device of apparatus 2000 is located in the lower compartment that is beneath upper compartment 2052. Apparatus 2000 further comprises a plurality of HDMI cables 2100, 2102, 2104 and 2106. Each HDMI cable has a first HDMI connector at one end of the cable for connection to a HDMI signal source device such as a notebook, Blue-Ray player, personal computer, DSS receiver, etc. Each HDMI cable includes a second HDMI connector that is on the opposite end of the cable and located in the lower compartment (beneath upper compartment 2052) where it is connected to a corresponding input of the HDMI signal switcher device. In one embodiment, each HDMI cable 2100, 2102, 2104 and 2106 is an Extron "Show Me" cable manufactured by Extron Electronics of Anaheim, Calif., which was described in the foregoing description. Each HDMI cable 2100, 2102, 2104 and 2106 passes through a corresponding one of strain reliefs 2070. Apparatus 2000 includes an HDMI output connector (not shown) that performs the same function as HDMI output connector 1250 which is shown in FIG. 17 and described in the foregoing description. An external HDMI cable (not shown) may be connected between the HDMI output connector of apparatus 2000 and a main presentation display device (not shown). Each HDMI cable 2100, 2102, 2104 and 2106 has a share button which when pressed, switches a connected HDMI signal source device (e.g. Blue-ray player) to the main presentation device. The share button has the same function and configuration as the share button 310 described in the foregoing description (see FIG. 10). Specifically, pressing the share button creates a momentary contact closure which triggers the HDMI signal switcher device of apparatus 2000 to select the HDMI signals from a HDMI signal source device for presentation on the main presentation display.

Referring to FIGS. 18, 19 and 21, apparatus 2000 further comprises electrical power receptacle 2300 that is attached or mounted to wall structure 2008 and has the same configuration and function as electrical power receptacle 1300 which was described in the foregoing description (see FIG. 11). Electrical power receptacle 2300 is mounted to wall structure 2008 in the same manner as electrical power receptacle 1300. Electrical power receptacle 2300 has electrical contacts (not shown) on the rear thereof. Electrical power receptacle 2300 is mounted to wall structure 2008 at a specific location so that the aforementioned electrical contacts are accessible through the lower compartment that is beneath upper compartment 2052. Electrical wires (not shown) are located within the aforementioned lower compartment and connected to the electrical contacts of electrical power receptacle 2300. Several of these electrical wires are electrically connected to electrical power cable 2500. Electrical power cable 2500 includes male plug 2502 that is configured to be plugged into an electrical power source, such as an AC power receptacle that provides AC voltages (e.g. 115-120 VAC). Electrical power cable 2500 extends through strain relief 2504 in bottom panel member 2002. Electrical power cable 2500 also provides electrical power to the HDMI signal switcher device in the lower compartment (beneath upper compartment 2052). In one embodiment, electrical power receptacle 2300 is an AC power receptacle that is configured to provide typical AC voltages (e.g. 115-120 VAC) used to power devices such as computers, laptops, computer printers, monitors of computer displays.

Apparatus 2000 further comprises a pair of identically constructed electrical power devices 2302 and 2304 that are mounted or attached to sections 2024 and 2022, respectively, of wall structure 2008. Each electrical power device 2302 and 2304 has electrical contacts on the rear thereof which are accessible through the lower compartment that is under upper compartment 2052. Any suitable technique and fasteners may be used to attach electrical power devices 2302 and 2304 to sections 2024 and 2022, respectively. Electrical power devices 2302 and 2304 are identically constructed and have the same configuration as electrical power devices 1400 and 1500, respectively, which were described in the foregoing description. Since electrical power devices 2302 and 2304 are identically constructed, only electrical power device 2302 is briefly described. Electrical power device 2302 comprises electrical power receptacle 2320 and device charging ports 2322. Electrical power receptacle 2320 and device charging ports 2322 protrude through a generally rectangular shaped opening in section 2024 of wall structure 2008. Electrical power receptacle 2320 has the identical purpose and function as electrical power receptacle 1520 described in the foregoing description (see FIG. 11). Electrical power cable 2500 also provides electrical power to electrical power device 2302. Electrical power receptacle 2320 is configured to provide 110-120 VAC. However, it is to be understood that electrical power device 2302 may be configured so that electrical power receptacle 2320 provides a different voltage. Electrical power device 2302 comprises power conversion circuitry that converts 115-120 VAC to a relatively lower voltage that is provided at device charging ports 2322. This relatively lower voltage is used to charge and power devices such as cell phones, smart phones, tablet computers, e-readers, digital recorders, cameras, iPads, iPods, MP3 players, etc. The devices to be charged, e.g. smart phone, are plugged into device charging ports 2322. In a preferred embodiment, each device charging port 2322 comprises a USB charging port. In one embodiment, electrical power device 2302 is configured so that each device charging port 2322 provides 5V DC @ 700 mA (milliamperes). However, it is to be understood that electrical power device 2302 can be configured so that each device charging port 2322 provides other voltage levels and currents. In one embodiment, each electrical power device 2302 and 2304 is a commercially available Combination USB Charger With Tamper Resistant Receptacle-TR7740, manufactured by Cooper Wiring Devices of Peachtree City, Ga.

Referring to FIGS. 19 and 20, lid 2030 has curved edge 3400 that provides space or gap 3500 when lid 2030 is closed. Lid 2030 includes curved edge 3600 that provides space or gap 3700 when lid 2030 is closed. Spaces 3500 and 3700 are sized to allow HDMI cables 2100, 2102, 2104 and 2106 to pass therethrough when lid 2030 is closed.

Figure 22:
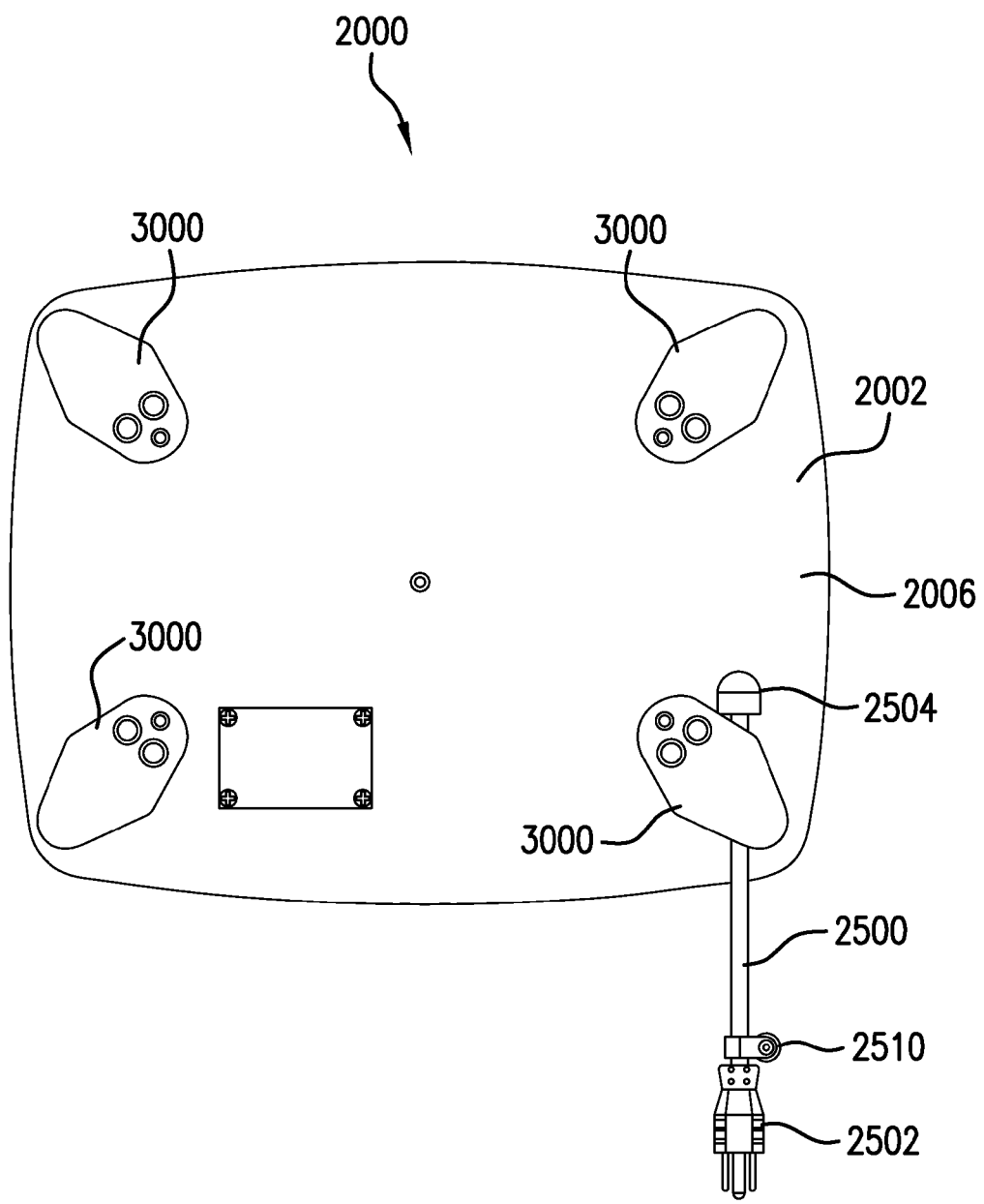
FIG. 22 is a bottom view of the apparatus of FIG. 19.
Figure 23:
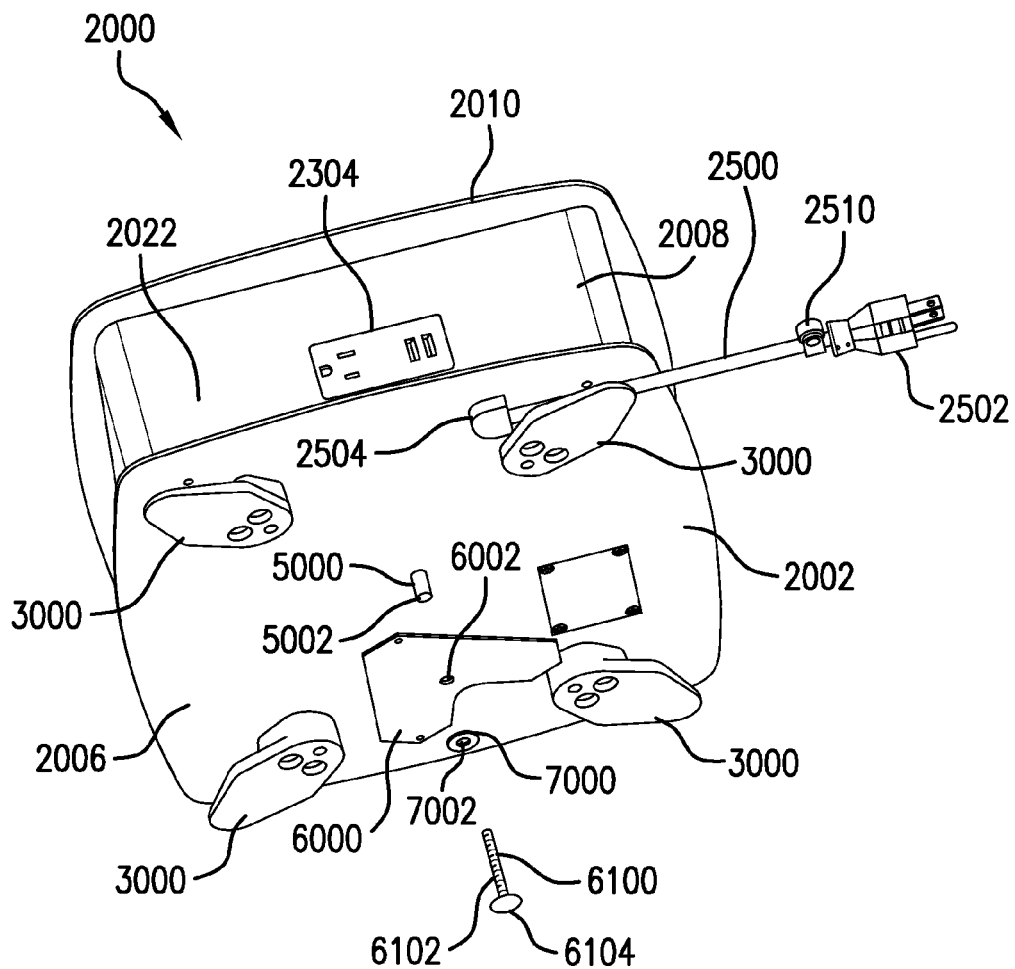
FIG. 23 is an exploded view, in perspective, of the apparatus of FIG. 19 configured to have a clamping device for clamping the apparatus to an article of furniture.

Referring to FIGS. 22-23, apparatus 2000 includes feet members 3000 which are attached to bottom side 2006 of bottom panel member 2002. Feet members 3000 are fabricated from any suitable material such as rubber, neoprene rubber, resin, plastic, polyvinylchloride, etc.

In one embodiment, portable apparatus 2000 is configured with a clamping device for removably attaching portable apparatus 2000 to an article of furniture 4000. Examples of an article of furniture include a work table, work bench, conference table, work station, etc. Referring to FIGS. 23-28, the clamping device comprises fastener device 5000 that is attached or joined to bottom panel member 2002. Fastener device 5000 has end 5002 and opposite end 5004. Any suitable method can be used to attach or join fastener device 5000 to bottom panel member 2002. End 5004 is configured and sized to be pressed-fit through bottom panel member 2002. In another embodiment, fastener device 5000 is integral with bottom panel member 2002. In a further embodiment, fastener device 5000 is welded, spot welded or brazed to bottom panel member 2002. In one embodiment, fastener device 5000 is a self-clinching fastener. Fastener device 5000 further includes threaded bore 5006 (see FIG. 25) and opening 5008 at end 5002 that provides access to threaded bore 5006. The clamping device further comprises plate member 6000 which has opening 6002. In one embodiment, opening 6002 is substantially centrally located. In a preferred embodiment, plate member 6000 is substantially flat. The clamping member further comprises threaded member 6100. Threaded member 6100 comprises shaft portion 6102 that is threaded for its entire length. Shaft portion 6102 is sized to be inserted through opening 6002 in plate member 6000. Shaft portion 6102 is configured to be threadedly engaged with threaded bore 5006 of fastener device 5000. Shaft portion 6102 has a diameter and a longitudinally extending axis. Threaded member 6100 also includes head portion 6104 that has a size that is relatively larger than the diameters of shaft portion 6102 and opening 6002 in plate member 6000. Threaded member 6100 may be configured as a thumb screw. In one embodiment, the clamping device includes washer member 7000 that has central opening 7002. Central opening 7002 has a diameter that is relatively smaller than the size of head portion 6104. Shaft portion 6102 of threaded member 6100 is disposed through central opening 7002 such that washer member 7000 is positioned between plate member 6000 and head portion 6104.

Figure 24:
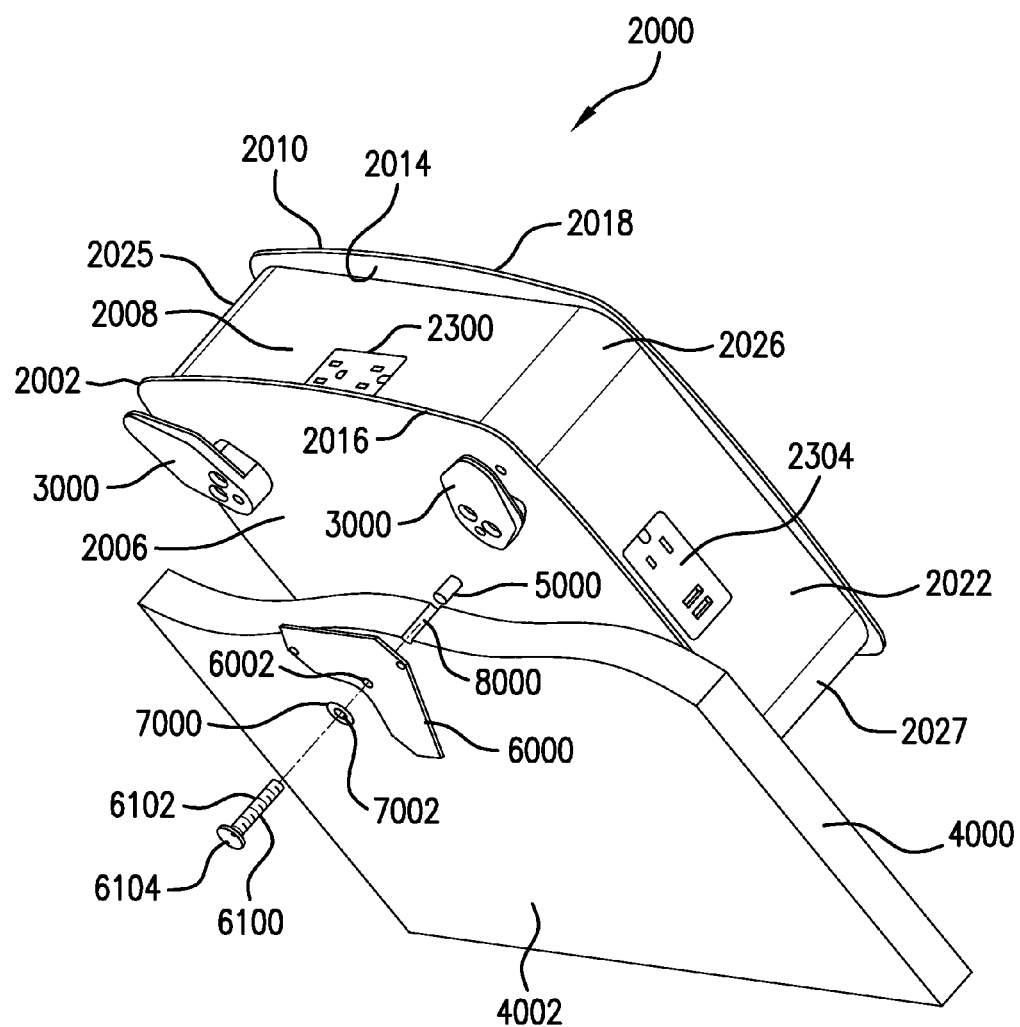
FIG. 24 is another exploded view, in perspective, of the apparatus of FIG. 19 being clamped to an article of furniture with the clamping device.
Figure 28:
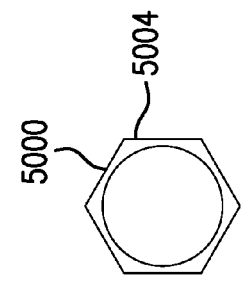
FIG. 28 is an end view taken along line 28-28 of FIG. 26.
Figure 25:
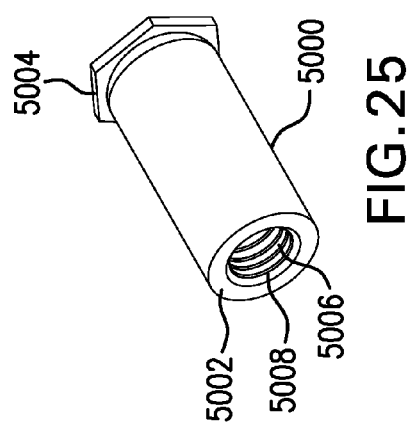
FIG. 25 is a perspective view of a fastener device shown in FIGS. 23 and 24.
Figure 26:
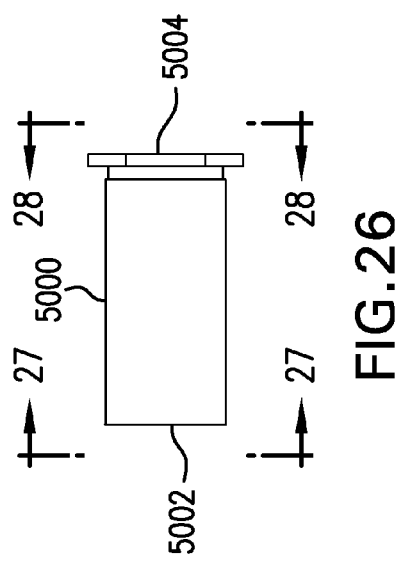
FIG. 26 is a side view of the fastener device.
Figure 27:
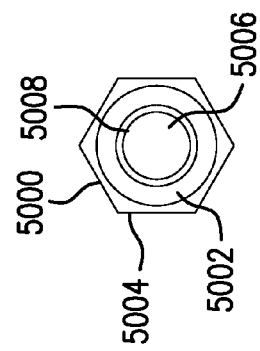
FIG. 27 is an end view taken along line 27-27 of FIG. 26.

In order to clamp portable apparatus 2000 to article furniture 4000, a user first drills a through-hole 8000 through the article of furniture 4000 (see FIG. 24). Through-hole 8000 must be sized to receive shaft portion 6102 of threaded member 6100. Next, the user positions portable apparatus 2000 over through-hole 8000 so that opening 5008 of fastener device 5000 is aligned with through-hole 8000. The user then inserts shaft portion 6102 through central opening 7002 of washer member 7000 and through opening 6002 of plate member 6000 and into through-hole 8000 and into opening 5008. The user then uses head portion 6104 to screw shaft portion 6102 into threaded bore 5006 of fastener device 5000 until plate member 6000 is firmly pressed against bottom side 4002 of article furniture 4000. When plate member 6000 firmly contacts and presses against bottom side 4002, washer member 7000 also firmly contacts and presses against plate member 6000 and head portion 6104 firmly contacts and presses against washer member 7000. The thickness of article of furniture 4000 will determine how long the user will have to continue to screw shaft portion 6102 into threaded bore 5006. Portable apparatus 2000 is now firmly attached to article of furniture 4000.

Referring to FIGS. 20, 22 and 23, power cord 2500 includes magnet 2510 that can be magnetically attached to the metallic portions of apparatus 2000. When the user is finished using apparatus 2000 and desires to store apparatus 2000, the user wraps power cord 2500 about apparatus 2000 and then magnetically attaches magnet 2510 to a metallic portion of apparatus 2000.

Apparatus 2000 is portable, light in weight and can be conveniently placed on desks, conference tables, work stations, work benches, etc. Apparatus 2000 can be configured to have any suitable size. Although apparatus 2000 is described as having four HDMI cables, it is to be understood that apparatus 2000 may be configured to have more than or less than four HDMI cables. In such an embodiment, the HDMI signal switcher device is modified to have a different number of HDMI signal inputs. In an alternate embodiment, apparatus 2000 can be configured so that wall structure 2008 has more than four sections.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. A portable apparatus to provide utility receptacles and cables at a selected location on a work station that has a work surface, comprising:
   a housing, comprising:
      a bottom panel member having a top surface, a bottom surface;
      a plurality of feet members attached to the bottom surface of the bottom panel member;
      a plurality of wall sections attached to the top surface of the bottom panel member, the plurality of wall sections defining an interior region, wherein at least one of the wall sections has an opening therein, and
      a horizontally oriented interior panel located within the interior region and attached to at least one of the wall sections so as to form an upper compartment and a lower compartment;
   at least one electrical power device located within the interior region and attached to one of the wall sections the at least one electrical power device comprising an electrical power receptacle and at least one device charging receptacle port which are positioned within the opening in the at least one of the wall sections;
   a High-Definition Multimedia Interface (HDMI) signal switcher device located within the lower compartment and comprising a plurality of HDMI input connectors and a HDMI output connector;
   a plurality of HDMI cables, wherein each of the cables extends from a corresponding through-hole in the horizontally oriented interior panel and has a first HDMI connector connected to a corresponding HDMI input connector of the HDMI signal switcher device and second HDMI connector for connection to a HDMI signal source device;
   a HDMI output connector attached to one of the wall sections and connected to the HDMI output connector of the HDMI signal switcher device;
   means for providing electrical power to the electrical power device and the HDMI signal switcher device; and
   a clamping device to removably attach the portable apparatus to an article of furniture having a through-hole, the clamping device comprising:
   a fastener device attached to the bottom surface of bottom panel member, the fastener device being substantially vertically oriented and having a distal end and a longitudinally extending axis, the fastener device having a threaded bore that extends along the longitudinally extending axis, and an opening at the distal end that provides access to the threaded bore;
   a plate member having an opening therethrough, the plate member being configured to contact a bottom surface of the article of furniture; and a threaded member comprising a head portion and a shaft portion, the shaft portion having a diameter and being sized for insertion through the opening in the plate member and through-hole of article of furniture and threadedly engaged with the threaded bore of the fastener device, the head portion having a size that is relatively larger than the diameters of the shaft member and the opening in the plate member device.

2. The portable apparatus according to claim 1 wherein one of the plurality of wall sections has an opening therein, the portable apparatus further comprising a power receptacle mounted to and positioned within the opening of said one of the plurality of wall sections.

3. The portable apparatus according to claim 1 further comprising a top panel member positioned over and attached to the plurality of wall sections, the top panel member having an opening to provide access to the interior region.

4. The portable apparatus according to claim 3 further comprising a lid positioned within the opening of the top panel member and pivotally attached to the top panel member, the lid being pivotal to an open position to provide access to the interior region and to a closed position.

5. The portable apparatus according to claim 4 wherein the lid has a curved edge that provides a gap between the lid and the top panel member when the lid is in the closed position, wherein the curved edge is sized so as to provide the gap with a size that allows the passage therethrough of the HDMI cables when the lid is in the closed position.

6. The portable apparatus according to claim 4 wherein the top panel member has an inner edge that extends about the opening in the top panel member, the portable apparatus further comprising a locking device comprising:
   a movable member movably attached to the lid, the movable member being movable to a first position in order to lock the lid in the closed position and to a second position to allow the lid to be positioned to the opened position; and
   a stationary contact member attached to the inner edge of the top panel member at a predetermined location so that the stationary contact member is aligned with the movable member when the lid is closed and the movable member moves underneath and frictionally contacts the stationary contact member when the movable member is moved to the first position.

7. The portable apparatus according to claim 1 wherein the at least one device charging receptacle port comprises a USB charging port.

8. The portable apparatus according to claim 1 wherein the at least one electrical power receptacle comprises an alternating current (AC) power receptacle.

9. The portable apparatus according to claim 1 wherein the electrical power device comprises an input for receiving a first electrical voltage at a first electrical current and conversion circuitry that converts the first voltage to a second voltage at a second electrical current, wherein the second electrical voltage and second electrical current is less than the first electrical voltage and the first electrical current, respectively.

10. The portable apparatus according to claim 1 wherein each HDMI cable includes a switch that, when pressed, triggers the HDMI signal switcher device to connect the HDMI signal source device connected to the HDMI cable to a main presentation display.

11. The portable apparatus according to claim 1 further comprising a plurality of threaded nuts embedded in the bottom surface of the bottom panel member, wherein the threaded nuts confront a work surface when the apparatus is positioned on the work surface, wherein each of the threaded nuts is configured to be engaged with a complementary screw.

12. The portable apparatus according to claim 1 wherein the clamping device further comprises a washer member having an opening that has a diameter that is relatively smaller than the size of the head portion, the shaft portion being disposed through the opening of the washer member, wherein the washer member is positioned between the plate member and the head portion of the threaded member.

13. The portable apparatus according to claim 12 wherein the plate member has a first side for contacting the bottom surface of the article of furniture and an opposite, second side for contacting the washer member, the first and second sides being substantially flat.

* * * * *